US012749342B1

(12) United States Patent
Hanif et al.

(10) Patent No.: US 12,749,342 B1
(45) Date of Patent: Sep. 29, 2026

(54) AGE VERIFICATION

(71) Applicant: Shufti Pro Ltd., London (GB)

(72) Inventors: Muhammad Shahid Hanif, Lahore (PK); Muhammad Tariq Bashir Awan, Lahore (PK)

(73) Assignee: SHUFTI PRO LTD., London (GB)

( * ) Notice: Subject to any disclaimer, the term of this patent is extended or adjusted under 35 U.S.C. 154(b) by 0 days.

(21) Appl. No.: 19/452,126

(22) Filed: Jan. 16, 2026

(51) Int. Cl.
*G06V 40/16* (2022.01)
*G06V 40/40* (2022.01)
*G06V 40/50* (2022.01)
*H04L 9/32* (2006.01)

(52) U.S. Cl.
CPC ............ *G06V 40/178* (2022.01); *G06V 40/40* (2022.01); *G06V 40/50* (2022.01); *H04L 9/3228* (2013.01); *H04L 9/3231* (2013.01)

(58) Field of Classification Search
CPC ...... G06V 40/178; G06V 40/40; G06V 40/50; H04L 9/3228; H04L 9/3231
See application file for complete search history.

(56) References Cited

U.S. PATENT DOCUMENTS 8,037,316 B2 10/2011 Gudorf et al.
10,535,062 B1 * 1/2020 Rule .................... G06Q 20/352
11,425,119 B2 8/2022 Graham et al.
D1,012,902 S 1/2024 Wu et al.
2007/0098225 A1 5/2007 Piccionelli et al.
2011/0047629 A1 2/2011 Mitchell et al.
2013/0110716 A1 5/2013 Rekhi et al.
2013/0254288 A1 9/2013 Harrison et al.
2014/0101730 A1 4/2014 Webber et al.
2023/0171577 A1 6/2023 Chen et al.
2023/0230084 A1 7/2023 Dai et al.
2025/0285467 A1 * 9/2025 Tripathi .................... G06T 3/18

FOREIGN PATENT DOCUMENTS

CN 106529377 A * 3/2017 ........... G06V 40/171
GB 2632705 A * 2/2025 ............. G06V 10/82

* cited by examiner

*Primary Examiner* — Carol W Chan
(74) *Attorney, Agent, or Firm* — STERNE, KESSLER, GOLDSTEIN & FOX P.L.L.C.

(57) ABSTRACT

Disclosed herein are system, method, and device embodiments for verifying the liveness and age of a user without sharing personal identifiable information of the user. To verify the age of a user, machine learning models running on a user device may use a live self-image of the user as input. The outputs of these machine learning models may be input into a first sub-model of a final machine learning model that uses split inference to run inference until a predetermined layer k. The features at the predetermined layer k of this final machine learning model may be encoded into a one-time age token (OTAT) which is encrypted, time-bound, and submitted to a merchant. The merchant may send this token to an age verification platform that verifies the age of user using a second sub-model of the final machine learning model and the OTAT.

7 Claims, 19 Drawing Sheets

300

302

```
{
  "ver": "1.0" ,
  "iat": 1733150400,                          / / Issued at (Unix timestamp)
  "exp": 1733152200,                          / / Expires  (iat + 30 min)
  "jti": "a1b2c3d4-e5f6-7890:,                / / Unique token ID (single-use)

  // TENSOR DATA – Core Payload (Could be an array of multiple tensors)
  "tensor": [ [0.234, -0.891, 0.445, 0.112, ...], ...], // Output if from Layer k
  "tensor_meta": {
    "model_versions": "v2.3",                 / / Client model version
    "dimensions":  [ [1, 512], ...],          / / Tensor shape
    "layer":  ["k" , ...]                     / / Which layer output
  } ,

  / / Device Attestation
  "attestation": {
    "platform":  "ios",                       / / ios  |  android
    "token" :  "<app_attest_asseration>"      / / Platform attestation token
  } ,
                                              / / ios  |  android
  / / QR Flow Only (optional)
  "session": {
    "id" :  "merchant-session-uuid",          / / From QR code  (QR flow only)
    "merchant_id":  "merchant-123"            / / From QR code  (QR flow only)
  }
}
```

FIG. 3

AGE VERIFICATION

BACKGROUND

Just as a bar verifies a person's age before lawfully admitting that person to the physical premises, online systems may verify a user's age before admitting the user to the digital premises. For instance, a user may need to verify their age to enter an age-restricted website, access social media, purchase an age-restricted item, create a new account, etc. However, verifying a user's age online presents unique challenges given the obscurity and anonymity of an Internt connection and the need for scalability within digital solutions.

Presently, many online systems just verify a user's age by asking the user "Are you over 18 years of age? Yes/No." Of course, the user clicks "Yes." Obviously, this is deficient.

Accordingly, online age-verification systems exist that verify a user's age. Such tools may serve businesses, vendors, websites, and other online actors by providing a service accessed via an application programming interface ("API"). For example, a user may navigate to a website that provides age-restricted content (e.g., a gambling website). The age-restricted website may route the user to the age-verification API to verify that the user meets an age requirement (e.g., older than 18, older than 21, etc.). The user may provide a picture of a government identification ("ID"), a current image or video of themselves (known colloquially as a "selfie" and referred to below as a "self-image"), and other information to the API. The API may return a result verifying the user's age to the website, and the website may allow the user to access age-restricted content.

Age-verification systems are increasing in importance as governments and jurisdictions impose regulations and restrictions curtailing unfettered access to minors to unsavory aspects of online culture. Age-verification tools are thus evolving rapidly to meet the crucial need to verify users' ages in digital settings.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIG. 3 is an example payload containing tensor data, according to some embodiments.

Figure 1A:
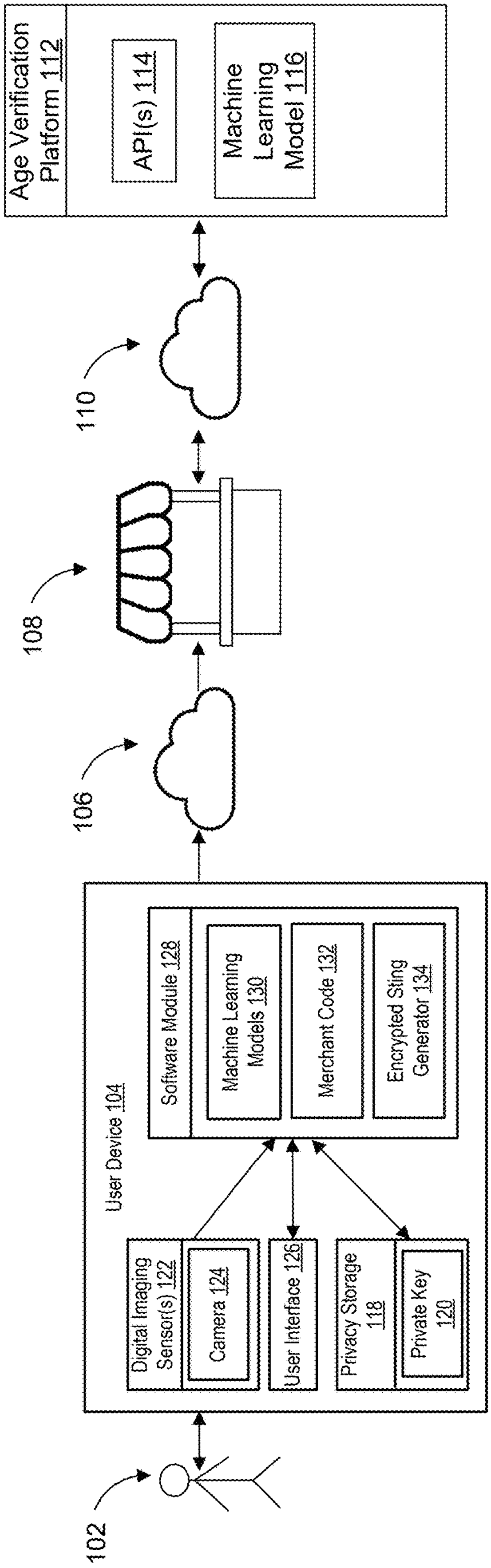
FIGS. 1A-1B are block diagrams of an environment implementing an age verification system, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are systems, apparatus device, method, and or computer program product embodiments, and/or combinations and sub-combinations thereof, for verifying the age of a user online. The technique allows a user to verify their age without exposing personal information—i.e., without even transmitting an image of their face.

As discussed above, legacy systems exist that verify a user's age online. To verify a user's age, these systems receive information such as an image of an ID, an address, biometric data, etc. For instance, to access a gambling website, a user may capture an image of their ID and a live self-image and transmit the images to the third-party API. The age-verification system may: (1) verify that the user is a live person; (2) verify that the live person matches the image on the driver's license; and (3) confirm using the date of birth listed on the driver's license that the user meets an age requirement for that website.

Such legacy approaches are fraught with privacy issues. A government ID includes a variety of personally identifiable information. A user's facial image is the epitome of personally identifiable information. Even if the transaction is encrypted, given the taboo nature of many age-restricted sites, users may be especially unwilling to share such personally identifying information with a third-party API or a merchant website.

No legacy tool provides a solution that allows a user to verify their age online without transmitting personally identifying information. By providing a client-side application capable of analyzing the images on the client device and generating a cryptographically secure token, the disclosed technique enables a user to avoid transmitting personally identifying information to the merchant or third-party API. The client-side application works in tandem with the server-side components (albeit without direct communication) to verify the user's age. The user may input the token in the merchant website, which routes only the token to the age-verification system. A server-side component of the age-verification system may verify the user's age and return the verification to the merchant.

This disclosure will refer to such a token as a "one-time age token" ("OTAT"). An OTAT contains no sensitive or personally identifying user information. The OTAT is just a fixed-length string of arbitrary characters. The use of an OTAT enables the processing of sensitive information to occur on a client device without sharing the information across the Internet. But these functions—i.e., both creating the OTAT on the client device and verifying the OTAT at the server-create additional technical problems that require additional technical solutions.

It is worth noting that to verify a user's age, an age-verification system may also have to verify a user's "liveness." A "liveness" may be thought of as an authenticity of a self-image. By verifying the liveness of a self-image, the system can safeguard against deep-fake and spoofing attacks (e.g., a malicious user submitting a picture of a different user, wearing a mask, using AI-generated images, etc.).

Legacy age-verification systems may employ a machine learning model to verify a user's age and liveness. Such legacy tools deploy a single machine learning model that analyzes the personal information (e.g., facial images, address information, government issued IDs etc.) as input and verify both the user's liveness and estimate the user's age. Some legacy tools may run such a machine learning model at the server, process a received image of the user, and return a result. Such a machine learning model runs sequentially through the multitude of parameters and requires a lot of computing time and resources. A client device may be incapable of running such a large model.

The disclosed technique realizes a solution to this problem by employing "split processing." Split processing divides the problem of verifying liveness and age. A first set of models may be trained to verify the liveness of a user. A second set of models may be trained to estimate the age of a user. Each model in the sets of models tackles a particular aspect of the age-estimation (or liveness detection) process. Dividing age-verification into two separate groups of models allows the lightweight models to run on a client's device. The smaller, discrete models can run in parallel, require less training, and are computationally more efficient.

The disclosed techniques also secure an OTAT against tampering during server-side verification by dividing the execution of a machine learning model between a client and server device. The below disclosure will refer to this technique as "split inferencing." In split inferencing, a final machine learning model may take as input the outputs of the various focused machine learning models discussed above. Based on these inputs, the final machine learning model may verify the liveness of the user while generating an estimate of an age of the user.

To secure the OTAT, this final determination machine learning model may be configured to stop inference at a specific layer. A first subset of the final machine learning model may be deployed on the client device and may stop inference on the client device at a predetermined layer k. The client device may encrypt, hash, or encapsulate the output of this first subset (as a tensor) and the resulting encrypted string can be used as the OTAT. The OTAT may be shared with the user, who copies/pastes, enters, or otherwise inputs the OTAT into the merchant website. The merchant website transmits the OTAT to the verification API. A second subset of the final machine learning model may be deployed on the server and may resume inference at the predetermined layer k. The server decrypts the OTAT having the encrypted tensor data and provides the tensor data as input to the second subset of the final machine learning model. The server thus receives only the OTAT, which includes only arbitrary and non-personally identifying information. But the server may resume processing and complete the inference to verify the user's age.

The above-described split-inferencing technique further increases security by not having the entire final machine learning model deployed in the application on a client device such that the model could be decompiled and taken advantage of to generate untrue or inaccurate tokens. Thus, the split inferencing allows for secure and reliable age-verification while also preserving the user's privacy.

A further technical benefit is realized through the security enhancement of having the OTAT remain valid only for a limited amount of time. While some legacy age-verification systems may generate a token for a user, the token is not time bound nor generated in the above-described secure, private fashion.

A further technical benefit is realized by marking the OTAT as used once the server component verifies an age (hence being referred to as a "one time" age token). For one, this prevents users from sharing tokens to get access to age restricted content they are not allowed access to.

A further technical benefit is realized by enabling a merchant-dependent or merchant-specific OTAT. To generate a merchant-dependent OTAT, a merchant may provide an identifier to the client device (e.g., a user may scan a QR code available on the merchant website), and the client device may generate the OTAT in a manner that encodes the merchant identifier in addition to the tensor data discussed above in the OTAT. The server-side components may then provide a positive verification of the user's age via the OTAT if the server-side components receive the OTAT from that particular merchant. The merchant-dependent OTAT will not function for other merchants. A merchant-dependent OTAT further increases the security of the OTAT given the narrower scope of permitted use.

Further, embodiments herein reduce the bandwidth needed to complete an age-verification process. By keeping personal and sensitive information on the client device and not sending large amounts of information used for age-verification over the Internet, the transactions require less bandwidth. A user need only enter the OTAT generated on their client device in the merchant website. The OTAT requires a fraction of the amount of information compared to the information necessary to verify a user's age using image data, video data, etc.

FIG. 1A is a block diagram of environment 100A having components for privacy-preserving age verification using client-side processing and cryptographic tokens, in accordance with some embodiments. Any operation discussed herein may be performed by any type of structure in the diagram, such as a module or dedicated device, in hardware, software, or any combination thereof. Any block in the block diagram of FIG. 1A may be regarded as a module, apparatus, dedicated device, general-purpose processor, engine, state machine, application, functional element, or related technology capable of and configured to perform its corresponding operation(s) described herein. Environment 100A may include user 102, user device 104, network 106, merchant 108, network 110, age verification platform 112, API 114, machine learning model 116, privacy storage 118, private key 120, digital imaging sensor 122, camera 124, user interface 126, software module 128, machine learning models 130, merchant code 132, and encrypted string generator 134.

User 102 may be an individual seeking to verify their age for accessing age-restricted content, services, or products online. For instance, user 102 may be attempting to access a gambling website, purchase alcohol or tobacco products online, create an account on a social media platform with age restrictions, access adult content, enter a virtual casino, purchase age-restricted video games, or verify their identity for financial services that require age verification. User 102 may be located anywhere in the world and may be using various types of devices to access online services. In some embodiments, user 102 may be a minor attempting to access age-restricted content, in which case the system may prevent access. In other embodiments, user 102 may be an adult legitimately seeking to verify their age while maintaining privacy of their personal information. User 102 may interact with the age verification system through multiple sessions, which may require fresh verification tokens for each merchant or service they wish to access.

User device 104 may be any computing device capable of capturing images and processing data locally. For example, user device 104 may be a smartphone, tablet computer, laptop computer, desktop computer, smart glasses, augmented reality headset, virtual reality device, or any other device equipped with processing capabilities and image capture functionality. User device 104 may run a dedicated mobile application, web application, or browser-based interface that facilitates the age verification process. In some embodiments, user device 104 may have specialized hardware security modules or trusted execution environments that can provide additional security for cryptographic operations. User device 104 may also include biometric sensors such as fingerprint readers, iris scanners, or voice recognition systems that can provide additional authentication factors. The device may operate on various operating systems including iOS, Android, Windows, macOS, or Linux, and may support different hardware architectures such as ARM, x86, or specialized AI processing chips.

Network 106 may provide connectivity between user device 104 and merchant 108. Network 106 may be the Internet, a local area network (LAN), a wide area network (WAN), a wireless network such as Wi-Fi or cellular (3G, 4G, 5G), a satellite network, or various other types of networks as would be appreciated by a person of ordinary skill in the art. Network 106 may employ various security protocols such as TLS/SSL, VPN tunneling, or end-to-end encryption to protect data transmission. In some embodiments, network 106 may include content delivery networks (CDNs) that cache and distribute age verification interfaces closer to users for improved performance. Network 106 may also support various communication protocols including HTTP/HTTPS, Web Socket, gRPC, or custom protocols optimized for the age verification system.

Merchant 108 may be any online business, service provider, or platform that requires age verification for legal compliance or business policy reasons. For example, merchant 108 may be an online casino, liquor store, tobacco retailer, adult entertainment platform, social media network, dating application, financial services provider, pharmaceutical company selling age-restricted medications, or any other entity that must verify user ages before providing services. Merchant 108 may operate websites, mobile applications, or API-based services that integrate with the age verification system. In some embodiments, merchant 108 may be a brick-and-mortar business with an online presence, such as a restaurant chain that offers online ordering of alcoholic beverages. Merchant 108 may have different age requirements depending on their jurisdiction and the type of content or service they provide—for example, requiring users to be 18+ for some content and 21+ for others. Merchant 108 may also maintain customer databases and may need to periodically re-verify user ages or update verification status.

Network 110 may provide connectivity between merchant 108 and age verification platform 112. Similar to network 106, network 110 may be the Internet or various other network types, and may employ security protocols to protect sensitive verification data. Network 110 may be the same physical network as network 106 but represents a different logical connection in the system architecture. In some embodiments, network 110 may include dedicated private networks or virtual private networks (VPNs) that can provide enhanced security for merchant-to-platform communications. Network 110 may also support high-availability configurations with redundant connections and failover mechanisms to ensure continuous service availability.

Age verification platform 112 may be a server-based system that provides age verification services to multiple merchants through a standardized interface. Age verification platform 112 may operate in cloud computing environments such as Amazon Web Services (AWS), Microsoft Azure, Google Cloud Platform, or private cloud infrastructures. The platform may be designed for high scalability, capable of processing millions of verification requests per day across thousands of merchant clients. Age verification platform 112 may maintain compliance with various privacy regulations such as GDPR, CCPA, COPPA, and other regional data protection laws. In some embodiments, age verification platform 112 may operate across multiple geographic regions to provide low-latency service and comply with data residency requirements. The platform may also provide analytics and reporting capabilities to merchants, allowing them to track verification success rates, user demographics (in aggregate), and system performance metrics.

API 114 may provide a standardized interface that allows merchants to integrate age verification capabilities into their systems. API 114 may be a RESTful API, GraphQL interface, or other web service protocol that supports standard HTTP methods and authentication mechanisms. API 114 may provide endpoints for token verification, merchant registration, configuration management, and reporting. In some embodiments, API 114 may support both synchronous and asynchronous verification modes, allowing merchants to choose the integration pattern that best fits their application architecture. API 114 may also provide webhook capabilities that notify merchants of verification status changes or system events. The API may include rate limiting, authentication tokens, and other security measures to prevent abuse and ensure service quality. API 114 may also support different response formats such as JSON, XML, or custom binary protocols depending on merchant requirements.

Machine learning model 116 may be a sophisticated artificial intelligence system trained to process encrypted feature tensors and make age verification decisions. Machine learning model 116 may be based on various architectures such as deep neural networks, convolutional neural networks (CNNs), transformer models, or ensemble methods that combine multiple model types. The model may be trained on datasets of facial images with known age labels or known liveness labels, using techniques such as supervised learning, transfer learning, or federated learning to improve accuracy while preserving privacy. In some embodiments, machine learning model 116 may be continuously updated and retrained as new data becomes available, using techniques such as online learning or periodic batch updates. The model may also incorporate fairness and bias mitigation techniques to ensure equitable performance across different demographic groups. Machine learning model 116 may be optimized for different hardware configurations, including CPU-only environments, GPU-accelerated systems, or specialized AI chips such as TPUs or neural processing units.

Privacy storage 118 may be a secure data storage system designed to protect sensitive information while supporting the age verification process. In particular, privacy storage 118 may be implemented as a secure enclave or a trusted execution environment, or other separate processors within the main system on chip that handles cryptographic operations. Privacy storage 118 may employ various security measures such as encryption at rest, access controls, audit logging, and data anonymization techniques. The storage system may be designed to minimize data retention, automatically purging verification records after predetermined time periods to reduce privacy risks. In some embodiments, privacy storage 118 may use distributed storage architectures that spread data across multiple geographic locations while maintaining compliance with data residency requirements. The storage system may also implement zero-knowledge architectures where even system administrators cannot access raw user data. Privacy storage 118 may support various data formats including encrypted tokens, hashed identifiers, and anonymized analytics data, with different retention policies for each data type.

Private key 120 may be a cryptographic key used to secure the OTATs generated by the system. Private key 120 may be generated using industry-standard cryptographic algorithms such as RSA, Elliptic Curve Cryptography (ECC), or post-quantum cryptographic methods that resist attacks from quantum computers. The key may be stored in privacy storage 118 implemented as hardware security modules (HSMs), trusted execution environments, or secure key management systems that provide tamper resistance and access controls. In some embodiments, private key 120 may be part of a key rotation system that periodically generates new keys to limit the impact of potential key compromise. The key management system may also support key escrow, backup, and recovery procedures to ensure business continuity. Private key 120 may be used in conjunction with public key infrastructure (PKI) systems that manage certificate authorities, certificate revocation lists, and key distribution mechanisms.

Digital imaging sensor(s) 122 may be a hardware component within user device 104 that captures visual information for age verification purposes. Digital imaging sensor(s) 122 may be a CMOS or CCD sensor capable of capturing high-resolution images or video streams suitable for facial analysis. The sensor may support various features such as autofocus, image stabilization, low-light enhancement, and high dynamic range (HDR) imaging to ensure high-quality captures under different environmental conditions. In some embodiments, digital imaging sensor(s) 122 may include specialized features such as infrared imaging for liveness detection, depth sensing for 3D facial analysis, or multispectral imaging that can detect spoofing attempts. The sensor may also support real-time image processing capabilities that can perform initial quality checks and optimization before passing data to machine learning models.

Camera 124 may be the complete imaging system that includes digital imaging sensor(s) 122 along with supporting components such as lenses, image processors, and control systems. Camera 124 may be a front-facing camera optimized for selfie capture, a rear-facing camera with higher resolution capabilities, or a specialized camera system designed for biometric applications. Camera 124 may support various capture modes such as single-shot photography, burst mode for multiple samples, or video recording for liveness verification. In some embodiments, camera 124 may include multiple sensors that work together to provide enhanced security features, such as combining visible light and infrared imaging to detect presentation attacks. Camera 124 may also integrate with the device's operating system to provide secure capture modes that prevent screenshot or screen recording attacks.

User interface 126 may be a software component that provides the visual and interactive elements through which user 102 interacts with the age verification system. User interface 126 may be implemented as a native mobile application interface, a browser extension, a web-based interface, or a hybrid application that combines native and web technologies. User interface 126 may provide step-by-step guidance for the verification process, including instructions for proper image capture, lighting requirements, and positioning guidelines. In some embodiments, user interface 126 may include accessibility features such as voice guidance, high contrast modes, or support for assistive technologies to ensure the system is usable by individuals with disabilities. User interface 126 may also provide real-time feedback during image capture, such as face detection overlays, quality indicators, or error messages that help users capture suitable images for verification.

Software module 128 may be a comprehensive software component that orchestrates the client-side age verification process on user device 104. Software module 128 may include various sub-components such as image processing libraries, machine learning inference engines, cryptographic libraries, and network communication modules. The module may be implemented using various programming languages and frameworks such as Swift/Objective-C for iOS, Java/Kotlin for Android, JavaScript for web applications, or cross-platform frameworks such as React Native or Flutter. In some embodiments, software module 128 may include security features such as code obfuscation, anti-tampering mechanisms, or runtime application self-protection (RASP) to prevent reverse engineering or malicious modification. The module may also include performance optimization features such as model quantization, hardware acceleration, or adaptive processing that adjusts computational intensity based on device capabilities.

Machine learning models 130 may be a collection of specialized artificial intelligence models that work together to perform different aspects of the age verification process. Machine learning models 130 may include liveness detection models that verify the authenticity of captured images and age estimation models that predict user age from facial features. Each model within machine learning models 130 may be optimized for specific tasks and may use different architectures such as convolutional neural networks for image analysis, recurrent neural networks for temporal analysis, or attention mechanisms for feature selection. In some embodiments, machine learning models 130 may be designed to run efficiently on mobile devices with limited computational resources, using techniques such as model compression, pruning, or knowledge distillation to reduce model size and inference time while maintaining accuracy.

Merchant code 132 may be a unique identifier that associates age verification tokens with specific merchants or services. Merchant code 132 may be a cryptographically secure random string, a structured identifier that encodes merchant information, or a time-limited token that expires after a predetermined period. The code may be generated by age verification platform 112 and distributed to merchants through secure channels such as encrypted email, secure file transfer, or API-based provisioning systems. In some embodiments, merchant code 132 may include additional metadata such as verification requirements (minimum age, specific checks), geographic restrictions, or service categories that help customize the verification process for different use cases. Merchant code 132 may also support hierarchical structures that allow large merchants with multiple brands or services to manage verification requirements across their entire organization.

Encrypted string generator 134 may be a cryptographic component responsible for creating secure, tamper-resistant OTATs. Encrypted string generator 134 may implement various encryption algorithms such as AES (Advanced Encryption Standard), ChaCha20, or other symmetric encryption methods, combined with message authentication codes (MACs) or digital signatures to ensure data integrity. The generator may also implement additional security features such as key derivation functions, salt generation, or nonce management to prevent replay attacks and ensure token uniqueness. The generator may also implement token versioning systems that allow for cryptographic algorithm updates while maintaining backward compatibility with existing merchant integrations. In some embodiments, encrypted string generator 134 further implements a key encapsulation mechanism (KEM) to establish a per-token shared secret with age verification platform 112 and uses the shared secret to derive an authenticated encryption with associated data (AEAD) key for encrypting the OTAT payload.

In operation, environment 100A may enable a privacy-preserving age verification process that begins when user 102 attempts to access age-restricted content or services provided by merchant 108. The process may leverage client-side processing to analyze facial images without transmitting personally identifiable information across networks, while still providing reliable age verification through cryptographically secure OTATs.

When user 102 navigates to merchant 108's website or application and attempts to access age-restricted content, merchant 108 may redirect user 102 to initiate the age verification process. This redirection may include merchant code 132, which identifies the specific merchant and their verification requirements. The verification requirements may include parameters that indicate the minimum required age for the user, a range of ages, etc. User 102 may then launch a dedicated age verification application on user device 104 or access a web-based interface through their device's browser such as a browser extension.

The age verification process may begin with user device 104 using camera 124 and digital imaging sensor(s) 122 to capture one or more images of user 102's face. User interface 126 may provide guidance to ensure proper image capture, including instructions for lighting, positioning, and facial expression. The captured images may be processed entirely on user device 104. Machine learning models 130 may analyze various aspects of the images or the whole image for liveness detection to prevent spoofing attacks and age estimation based on facial features. Machine learning models 130 may comprise machine learning models directed towards age estimation and other machine learning models directed towards liveness detection. Some of machine learning models 130 may be trained to determine whether a specific attribute is present or not in the facial images. Further, these machine learning models may output a value from zero to one indicating the confidence that the specific attribute is present or not. For example, one liveness machine learning model may be detecting whether the user is covering their face in the image. This machine learning model may output a 0.9 indicating that it is relatively likely that the user is blocking their face in some way.

Software module 128 may coordinate the execution of multiple specialized models within machine learning models 130, which may run in parallel to improve processing efficiency. These models may generate confidence scores and feature vectors that are then processed by a partial machine learning model that stops inference at a predetermined layer, creating a feature tensor that contains the necessary information for age verification without exposing raw biometric data.

Encrypted string generator 134 may then create an OTAT by encrypting a payload that may comprise the feature tensor, merchant code 132, timestamp information, and other metadata. This encryption process may use private key 120 and produce a cryptographically secure OTAT that contains no personally identifiable information but enables server-side age verification.

The generated OTAT may be displayed to user 102 through user interface 126, and user 102 may manually enter or copy this token into merchant 108's website or application. Merchant 108 may then transmit the token to age verification platform 112 through API 114 over network 110.

Age verification platform 112 may receive the token and use machine learning model 116 to complete the verification process. The platform may decrypt the token to extract the feature tensor and other metadata, then resume machine learning inference from the predetermined layer where client-side processing stopped. This split inferencing approach may ensure that the complete machine learning model is never fully deployed on client devices, preventing potential reverse engineering or token forgery.

A verification result may be returned to merchant 108 through API 114, indicating whether user 102 meets the required age threshold. Privacy storage 118 may temporarily store anonymized verification metadata for analytics and fraud prevention purposes, but no personally identifiable information may be retained.

Figure 1B:
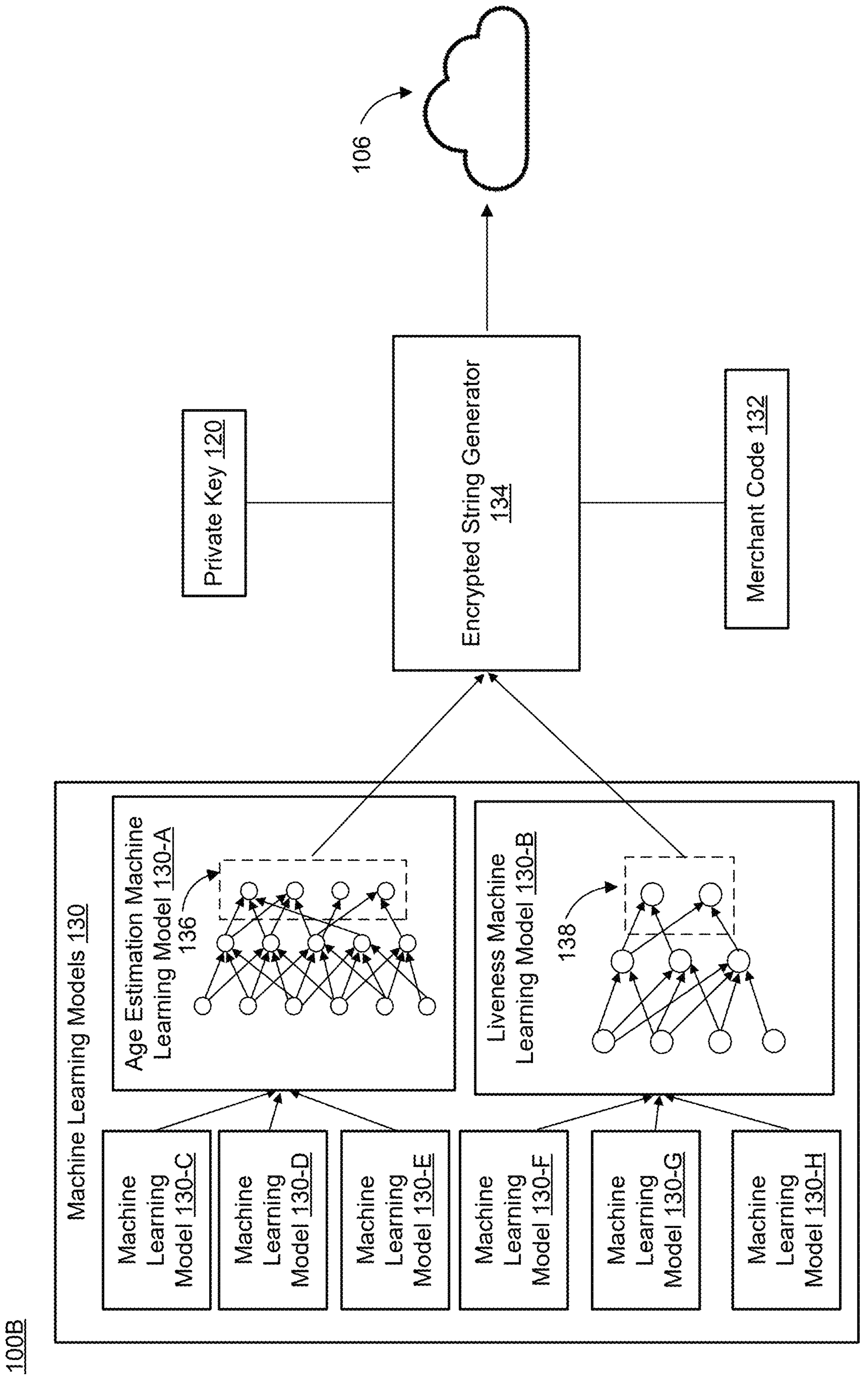

FIG. 1B is a block diagram of environment 100B illustrating a comprehensive age verification system that may enable secure, privacy-preserving verification of a user's age without transmitting personally identifiable information across network 110, in accordance with some embodiments. Environment 100B may demonstrate an implementation where user 102 may operate user device 104 to generate a cryptographically secure OTAT that can be verified by merchant 108 through age verification platform 112, while maintaining complete privacy of the user's biometric and personal data.

Machine learning models 130 may represent a sophisticated ensemble of specialized models that collectively analyze facial images to determine age and liveness. This ensemble may include age estimation machine learning model 130A, which may be specifically trained to estimate the chronological age of individuals based on facial features, skin texture, bone structure, and other age-related characteristics. Age estimation machine learning model 130A may utilize convolutional neural networks trained on diverse datasets representing various ethnicities, genders, and age ranges to ensure accurate and unbiased age estimation. The model may also account for factors such as lighting conditions, image quality, and facial expressions that could affect age estimation accuracy.

Liveness machine learning model 130B may detect whether the captured image represents a live person rather than a photograph, video, mask, or artificially generated image. Liveness machine learning model 130B may analyze micro-movements, blinking patterns, skin texture variations, and other indicators of biological authenticity. The model may also detect presentation attacks such as printed photographs, digital displays showing images or videos, silicone masks, or deepfake-generated content. In some embodiments, liveness machine learning model 130B may require user 102 to perform specific actions such as blinking, smiling, turning their head, or speaking predetermined phrases to verify liveness. Machine learning models 130C, 130D, and 130E may provide analysis capabilities for age estimation. For example, machine learning model 130C may focus on facial landmark detection and geometric analysis, identifying key facial points and measuring proportional relationships that correlate with age. Machine learning model 130D may specialize in skin analysis, examining texture, wrinkles, age spots, and other dermatological indicators of aging. Machine learning model 130E may concentrate on eye region analysis, as the eye area often provides reliable age-related information through factors such as crow's feet, under-eye bags, and eyelid positioning. The foregoing examples are just provided for illustrative purposes.

Overall, machine learning models 130C-130E may determine specific attributes of the facial image regarding age estimation. Machine learning models 130C-130E may be provided with a facial image as input into the models. The outputs of these models may be in the form of confidence intervals. The confidence intervals may indicate how confidently the machine learning model is in a specific attribute regarding age estimation being present in the facial image. The outputs of these machine learning models may be used as input into age estimation machine learning model 130A. Age estimation machine learning model 130A may be split between machine learning models 130 and machine learning models 116.

Machine learning models 130F, 130G, and 130H may provide additional specialized analysis capabilities for liveness detection. For example, machine learning model 130F may focus on analyzing micro-movements for detecting the liveness of a user. Machine learning model 130G may specialize in blinking patterns in relation to identifying the liveness of a user. Machine learning model 130H may concentrate skin texture variations, and other indicators of biological authenticity. The foregoing examples are just provided for illustrative purposes.

Overall, machine learning models 130F-130H may determine specific attributes of the facial image regarding liveness detection. Machine learning models 130F-130H may be provided with a facial image as input into the models. The output of these models may be in the form of confidence intervals. The confidence intervals may indicate how confidently the machine learning model is in a specific attribute regarding liveness detection being present in the facial image. The outputs of these machine learning models may be used as input into liveness machine learning model 130B. Liveness machine learning model 130B may be split between machine learning models 130 and machine learning models 116.

The parallel execution of machine learning models 130C-130H may provide several technical advantages over traditional monolithic approaches. Each model can be optimized for its specific task, which may result in higher accuracy and faster processing times. The distributed approach may also enable graceful degradation-if one model fails or produces uncertain results, the other models can compensate. Additionally, the parallel architecture may allow for real-time processing on client devices with limited computational resources, as each lightweight model may require fewer processing cycles than a single comprehensive model.

Merchant code 132 may enable merchant-specific OTAT generation, ensuring that OTATs generated for one merchant cannot be used fraudulently with other merchants. When user 102 initiates age verification through a specific merchant's website or application, the merchant may provide a unique identifier that gets encoded into the OTAT. This merchant-specific encoding may involve cryptographic binding of the merchant's identity to the token, timestamp-based merchant validation, or merchant-specific encryption keys. The merchant code system may prevent token replay attacks and ensure that age verification is contextually bound to the requesting merchant.

Encrypted string generator 134 may create the OTAT by combining outputs from age estimation machine learning model 130A and liveness machine learning model 130B with cryptographic security measures. The generator may process the feature tensor produced by age estimation machine learning model 130A and liveness machine learning model 130B and apply encryption using private key 120. The encryption process may involve multiple layers of security, including symmetric encryption for performance, asymmetric encryption for key exchange, digital signatures for authenticity verification, and hash functions for integrity checking. Encrypted string generator 134 may also incorporate timestamp information, device fingerprinting, and merchant-specific data to create a comprehensive and secure OTAT.

Predetermined layer k 136 and predetermined layer k 138 may represent the split-inferencing architecture that enhances security by dividing machine learning model execution between user device 104 and age verification platform 112. The final machine learning model that processes the ensemble outputs may be deliberately split at a predetermined layer, with the first portion executing on user device 104 and stopping at predetermined layer k 136. The output at this layer may represent intermediate feature representations that contain no personally identifiable information but retain the necessary information for age verification. The second portion of the model, beginning at predetermined layer k 136, may execute on age verification platform 112 after receiving the OTAT comprising the feature tensor generated from age estimation machine learning model 130A.

For example, age estimation machine learning model 130A may be a split age estimation machine learning model and perform inference up until predetermined layer k 136. The output age estimation feature tensor may be encoded into the OTAT generated by encrypted string generator 134. After being sent to the corresponding merchant 108 and ultimately sent to age verification platform 112, the feature tensor may then be determined from the decrypted OTAT. Age verification platform 112 may then input the age estimation feature tensor into a split age verification machine learning model in machine learning model 116. The split age verification machine learning model can continue inference at the predetermined layer k 136 until an age is output. The split age verification machine learning model in machine learning models 116 may be the rest of age estimation machine learning model 130A that is not included on user's device 104.

Similarly, liveness machine learning model 130B may be a split liveness machine learning model and perform inference up until predetermined layer k 138. The output liveness feature tensor may be encoded into the OTAT generated by encrypted string generator 134. After being sent to the corresponding merchant 108 and ultimately sent to age verification platform 112, the feature tensor may then be determined from the decrypted OTAT. Age verification platform 112 may then input the liveness feature tensor into a split liveness machine learning model in machine learning model 116. The split liveness machine learning model can continue inference at the predetermined layer k 138 until a liveness determination is output. The split liveness machine learning model in machine learning models 116 may be the rest of liveness machine learning model 130B that is not included on user's device 104.

This split-inferencing approach may provide multiple security benefits. First, it may prevent reverse engineering of the complete model, as no single device contains the entire algorithm. Second, it may ensure that raw biometric data never leaves user device 104, maintaining user privacy. Third, it may enable server-side verification without exposing sensitive information, as the server only processes abstract feature representations. The predetermined split point may be carefully chosen to balance security, privacy, and verification accuracy.

Network 106 may facilitate communication between the various system components while maintaining security and privacy. Network 106 may be the Internet, a private network, a cellular network, a Wi-Fi network, or a combination of different network types. The network infrastructure may support encrypted communications, secure token transmission, and real-time verification responses. In some embodiments, network 106 may include content delivery networks (CDNs) for distributing machine learning models to client devices, load balancers for managing verification requests, and redundant pathways for ensuring system availability. Network 106 may facilitate sending the OTAT generated by encrypted string generator 134 to merchant 108.

In operation, environment 100B may enable an age verification workflow that begins when user 102 requests access to age-restricted content through merchant 108. The merchant's system may redirect user 102 to initiate age verification, potentially providing a QR code or merchant identifier that user 102 may scan with user device 104. User device 104 may capture facial images using digital imaging sensor 122 and camera 124, then process these images through the ensemble of machine learning models 130C-130H running in parallel.

The final models may analyze the outputs of machine learning models 130C-130H as input accordingly. Age estimation machine learning model 130A may determine chronological age, liveness machine learning model 130B may verify biological authenticity and both may stop inference at predetermined layer k 136 and 138 respectively.

Encrypted string generator 134 may create an OTAT by encrypting the feature tensor output from age estimation machine learning model 130A and liveness machine learning model 130B along with merchant code 132. Additionally, timestamp information may be encoded into the OTAT. Encrypted string generator 134 may further encrypt the OTAT using private key 120. This token may be displayed to user 102 through user interface 126, who may then input the token into merchant 108's system. Merchant 108 may transmit the token to age verification platform 112 through API 114.

Alternative embodiments of environment 100B may implement additional security and functionality enhancements. For instance, the system may incorporate blockchain technology for immutable verification records, multi-factor authentication combining age verification with other identity factors, federated learning approaches that improve model accuracy without centralizing training data, or edge computing deployments that reduce network latency and improve user experience.

The system may also support batch verification for enterprise scenarios, real-time age monitoring for ongoing compliance, integration with identity management systems, and customizable verification workflows that adapt to different merchant requirements and regulatory environments. These alternative implementations may maintain the core privacy-preserving principles while extending the system's applicability to diverse use cases and deployment scenarios.

Figure 2A:
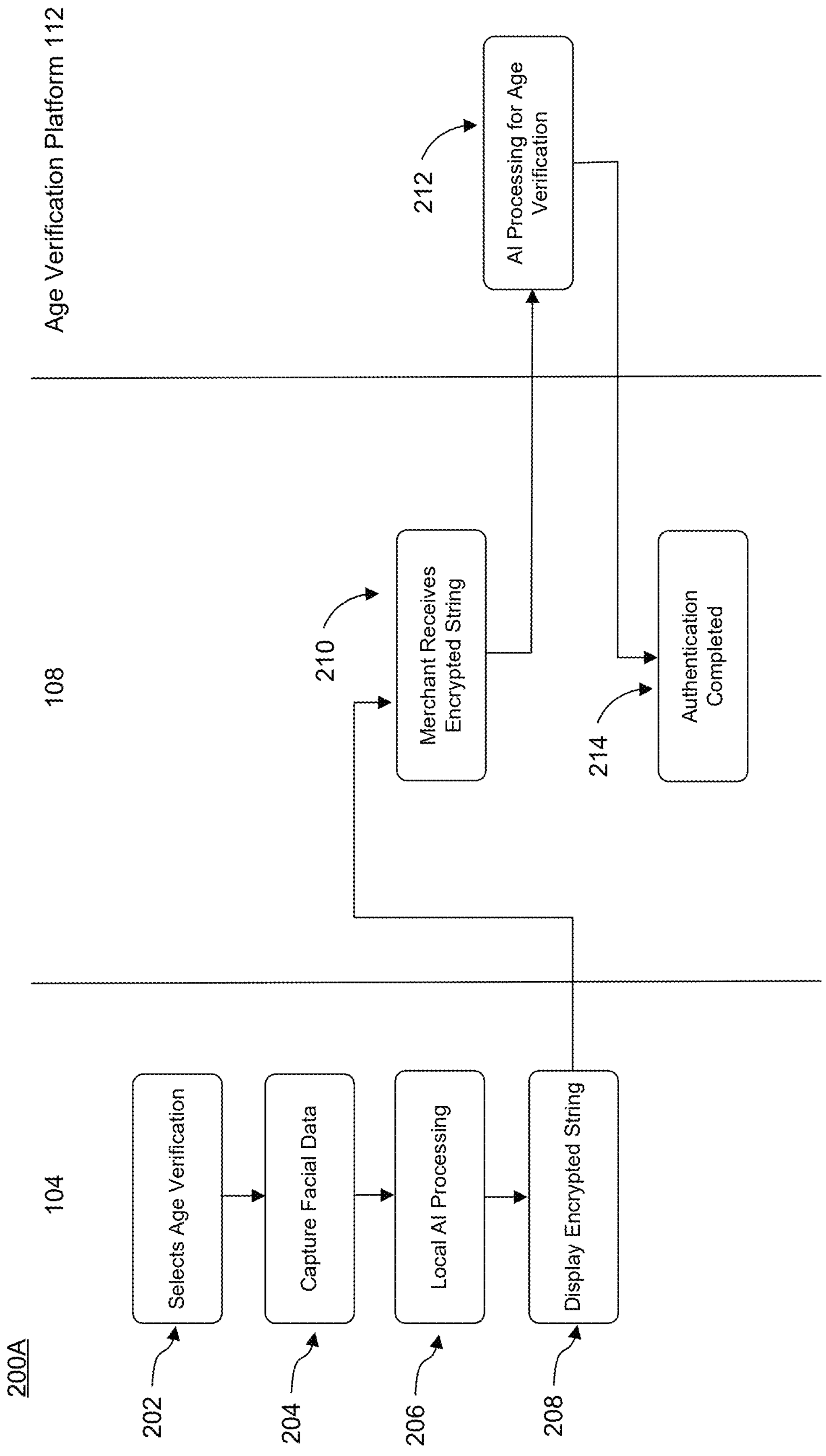
FIGS. 2A-2B, are flowcharts illustrating steps for verifying the age of a user with a merchant and user device, according to some embodiments.
Figure 2B:
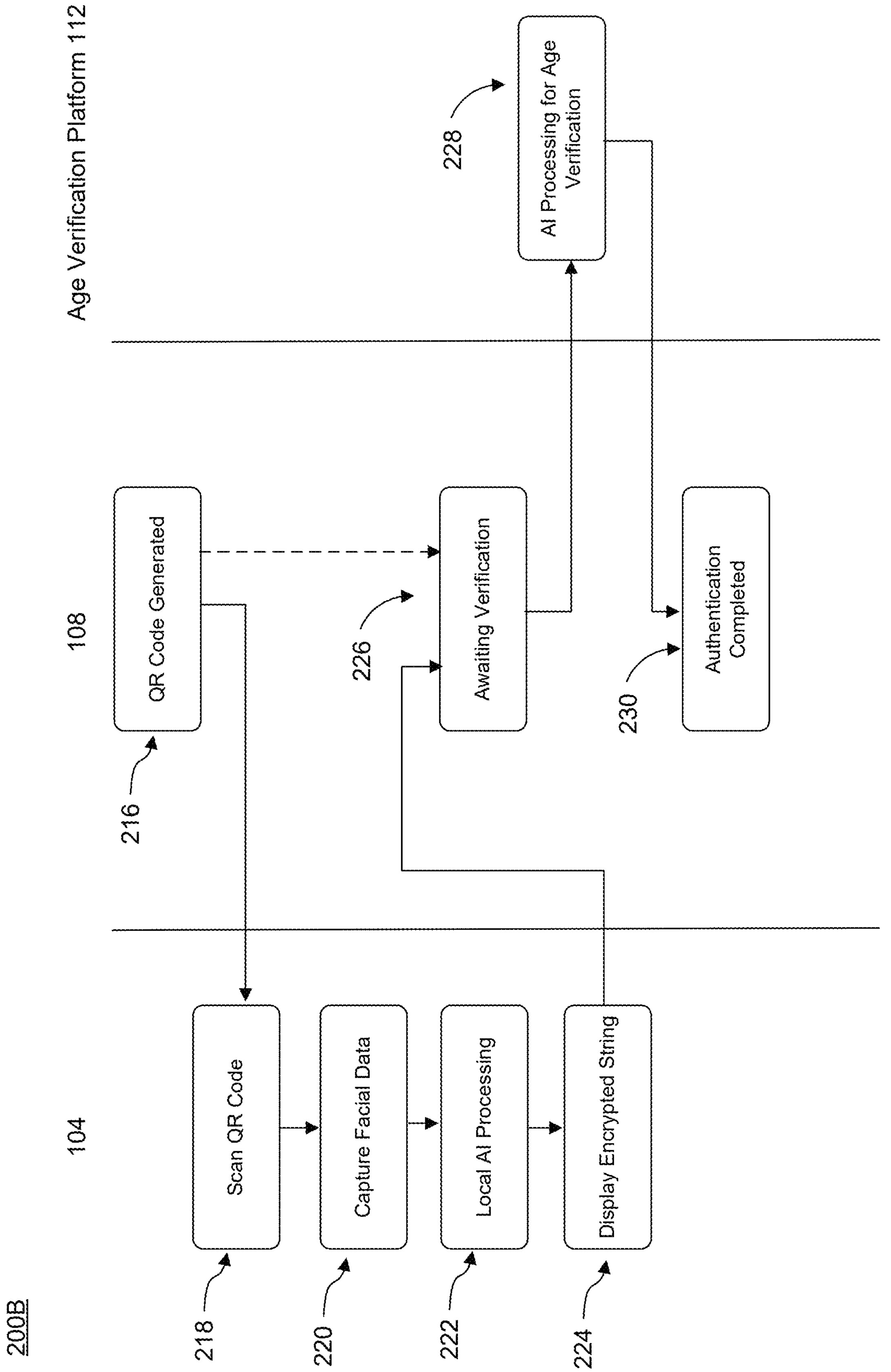

FIGS. 2A-2B, are flowcharts illustrating steps for verifying the age of a user with a merchant and user device, according to some embodiments. System 200A and 200B shall be described with reference to FIGS. 1A and 1B. However, system 200A and 200B are not limited to that example embodiment. System 200A and 200B may support various deployment scenarios and use cases beyond the basic age verification workflow.

System 200A and 200B may include user device 104, merchant 108, and age verification platform 112. System 200A and 200B may demonstrate a comprehensive age verification process that can enable secure, privacy-preserving verification of user ages across various digital platforms and services.

FIG. 2A is a flowchart illustrating steps for verifying the age of a user with a merchant and user device using an OTAT that is not merchant bound, according to some embodiments.

In 202, user 102 may select age verification on user device 104. A user may be attempting to access age-restricted content and be required to verify their age. A user may be operating on user device 104 which is separate from the age-restricted content. For example, user device 104 may be a mobile phone while they may wish to verify their age on another device where age verification is needed.

In 204, user device 104 may capture facial data with digital imaging sensor(s) 122, such as a camera. This facial data may be in the form of pictures of the user taken by user device 104. In some embodiments the facial data is input directly into machine learning models 130C-130H. In other embodiments the facial data is processed accordingly for input into machine learning models 130C-130H.

In 206, user device 104 may run local artificial intelligence (AI) processing such as inference of machine learning models 130. Machine learning models 130C-130H may generate outputs that are used as inputs to age estimation machine learning models 130A and liveness machine learning model 130B. Machine learning models 130C-130H may use the captured facial data, such as a facial image, as input. Machine learning models 130 may ultimately output an age estimation feature tensor at predetermined layer k 136 and a liveness feature tensor at predetermined layer k 138.

In 208, user interface 126 may display an encrypted string to user 102. The feature tensors from age estimation machine learning model 130A and liveness machine learning model 130B may be encoded into a string that is then encrypted using private key 120. The encrypted string may be generated using encrypted string generator 134. This string may also encode metadata surrounding the generation of the encrypted string. This encrypted string may be the OTAT.

In 210, merchant 108 may receive the encrypted string. In some embodiments user 102, using user interface 126 may submit the encrypted string to merchant 108 over network 106. In other embodiments user interface 126 may display the encrypted string and user 102 may submit the encrypted string, or OTAT, using another user device to a different merchant. Further, this encrypted string may work for age verification across multiple merchants.

In 212, age verification platform 112 may run AI processing for age verification using machine learning model 116. The encrypted string may be submitted to age verification platform 112 by merchant 108 or another merchant using API(s) 114 over network 110. Age verification platform may decrypt the encrypted string and decode the feature tensors generated in 206. The one or more feature tensors encoded into the encrypted string may be used as input to machine learning model 116 to finish inference at a predetermined layer k.

For example, machine learning model 116 may comprise an age estimation final machine learning model and/or a liveness final machine learning model. The inference of age estimation machine learning model 130A may be resumed at predetermined layer k 136 by the age estimation final machine learning model using the age estimation feature tensor. The output of the age estimation final machine learning model may be an age estimation of user 102. The inference of liveness machine learning model 130B may be resumed at predetermined layer k 138 by the liveness final machine learning model using the liveness feature tensor. The output of the liveness final machine learning model may be a determination whether user 102 is live, real, and not attempting to take advantage of the age verification process. The liveness final machine learning model and liveness machine learning model 130B may be a split model that put together would form a complete liveness machine learning model. Similarly, the age estimation final machine learning model and age estimation machine learning model 130A may be a split model that put together would form a complete age estimation machine learning model. The output of final machine learning model 116 may be a verification that user 102 meets the age requirement for merchant 108 or a denial that user 102 does not meet the age requirement for merchant 108.

In 214, merchant 108 may have completed the authentication. Age verification platform 112 may send confirmation to merchant 108 over network 110 that user 102 meets the age-requirement. In 214, the age of user 102 may be verified to meet the age-requirement therefore completing the age verification process. Merchant 108 may then allow user 102 access to age-restricted content.

FIG. 2B is a flowchart illustrating steps for verifying the age of a user with a merchant and user device using an OTAT that is merchant-bound, according to some embodiments.

In 216, merchant 108 may have a QR code generated. This QR code may comprise merchant code 132. This QR code allows the OTAT, or encrypted string, to be merchant-bound to 108 meaning the encrypted string will only work for age verification with merchant 108.

In 218, user device 104 may scan the QR code presented by merchant 108 to retrieve merchant code 132 from the QR code. This merchant code may be stored on user device 104 within software module 128. This QR code may be scanned by camera 124. For example, user 102 may navigate to merchant's 108 website that contains age-restricted content. Merchant 108 may generate a QR code comprising a code identifying merchant 108. This code may be displayed to user 102 and scanned by user device 104. Steps 216, 218, and 220 are optional, however, and in alternative embodiments, merchant code 132 may be displayed to user device 104 in any suitable form and/or transmitted to user device 104 without display.

In 220, similar to 204, user device 104 may capture facial data with digital imaging sensor(s) 122, such as a camera. This facial data may be in the form of pictures of the user taken by user device 104. In some embodiments the facial data is input directly into machine learning models 130C-130H. In other embodiments the facial data is processed accordingly for input into machine learning models 130C-130H.

In 222, similar to 206, user device 104 may run local AI processing such as inference of machine learning models 130. Machine learning models 130C-130H may generate outputs that are used as inputs to age estimation machine learning models 130A and liveness machine learning model 130B. Machine learning models 130C-130H may use the captured facial data, such as a facial image, as input. Machine learning models 130 may ultimately output an age estimation feature tensor at predetermined layer k 136 and a liveness feature tensor at predetermined layer k 138.

In 224, user interface 126 may display encrypted string to user 102. The feature tensors from age estimation machine learning model 130A and liveness machine learning model 130B may be encoded into a payload that is then encrypted using a hybrid encryption scheme comprising a key encapsulation mechanism (KEM) and authenticated encryption with associated data (AEAD). Encrypted string generator 134 may perform KEM encapsulation using a public key of age verification platform 112 to generate an encapsulation ciphertext and a shared secret, derive a symmetric encryption key from the shared secret, and AEAD-encrypt the payload. This encrypted string may also encode metadata surrounding the generation of the encrypted string. In some embodiments merchant code 132, received via the QR code, may be encoded into the encrypted string and authenticated as AEAD associated data (AAD) to bind the OTAT to merchant 108. This encrypted string may be the OTAT In 226, merchant 108 may be awaiting verification. Once merchant 108 generates and displays the QR code to user 102, merchant 108 may await verification of the user's 102 age. Further, in 226, merchant 108 may receive the encrypted string. In some embodiments user 102, using user interface 126, may submit the encrypted string to merchant 108 over network 106. In other embodiments, user interface 126 may display the encrypted string comprising merchant code 132 and user 102 may submit the encrypted string, or OTAT, to merchant 108 using a different user deice. Further, this encrypted string may only work for merchant 108.

In 228, age verification platform 112 may run AI processing for age verification using machine learning model 116. The encrypted string may be submitted to age verification platform 112 by merchant 108 or another merchant using API(s) 114 over network 110. Age verification platform 112 may decrypt the encrypted string and decode the feature tensors generated in 206. The one or more feature tensors encoded into the encrypted string may be used as input to machine learning model 116 in order to finish inference at a predetermined layer k. The encrypted string may be decrypted by decapsulating an encapsulation ciphertext using private key 120 to recover a shared secret and decrypting an AEAD-encrypted payload using a symmetric encryption key derived from the shared secret. Merchant code 132 may be validated as AEAD associated data (AAD) and/or as a payload field to ensure the OTAT is bound to the correct merchant, but merchant code 132 is not used as decryption key material. In 228, age verification platform 112 may ensure that the QR code metadata and merchant code 132 from the received encrypted string or OTAT matches merchant 108. This may ensure that the encrypted string generated for user 102 for merchant 108 is merchant specific, meaning the encrypted string or OTAT may only verify the age of user 102 for merchant 108. Age verification platform 112 may send to merchant 108 over network 110 approval or denial of the age of user 102. Denial can be caused also if merchant code 132 does not match the appropriate merchant 108. Also, denial may occur if encrypted string received from merchant 108 does not comprise a merchant code and QR code metadata.

In 230, similar to 214, merchant 108 may have completed authentication. Age verification platform 112 may send confirmation to merchant 108 over network 110 that user 102 meets the age-requirement. In 230, the age of user 102 may be verified to meet the age-requirement therefore completing the age verification process and allowing user 102 access to age-restricted content.

FIG. 3 illustrates an example payload containing tensor data, according to some embodiments. FIG. 3 shall be described with reference to FIGS. 1A and 1B. However, FIG. 3 is not limited to that example embodiment.

Data 302 may be encoded into the OTAT. For example, an OTAT generated by encrypted string generator 134 may comprise data 302. As discussed above, merchant identifier from the merchant's 108 QR code and tensors from age estimation machine learning models 130A and liveness machine learning model 130B may be encoded into OTAT. In some embodiments, OTAT may encode more information. Due to updates and versioning, OTAT may encode the version of software module 128 to ensure compatibility with age verification platform 112. The OTAT may be time-bound as described earlier and comprise a timestamp such as a Unix timestamp and an expiration time detailing how long the OTAT will be valid for. Further, the OTAT may have its own unique identifier.

Tensor data that is encoded into OTAT may not just be the output tensor from age estimation machine learning model 130A and liveness machine learning model 130B. Tensor data may also comprise metadata such as the version of machine learning models 130 as well as predetermined layer k 136 and 138. Also, the tensor data encoded into the OTAT may comprise the dimensions of the tensor outputs.

OTAT may further comprise device attestation data including the platform of user device 104 as well as a platform attestation token. This may be used for a security mechanism that verifies the authenticity and integrity of a device's hardware and software ensuring user device 104 meets security standards. In some embodiments where a QR code is introduced to the age verification process, data from the QR code may be encoded into the OTAT. In these embodiments, OTAT may comprise a merchant session unique identifier and merchant code 132. In these embodiments, the OTAT is valid for one merchant such as merchant 108.

Figure 4A:
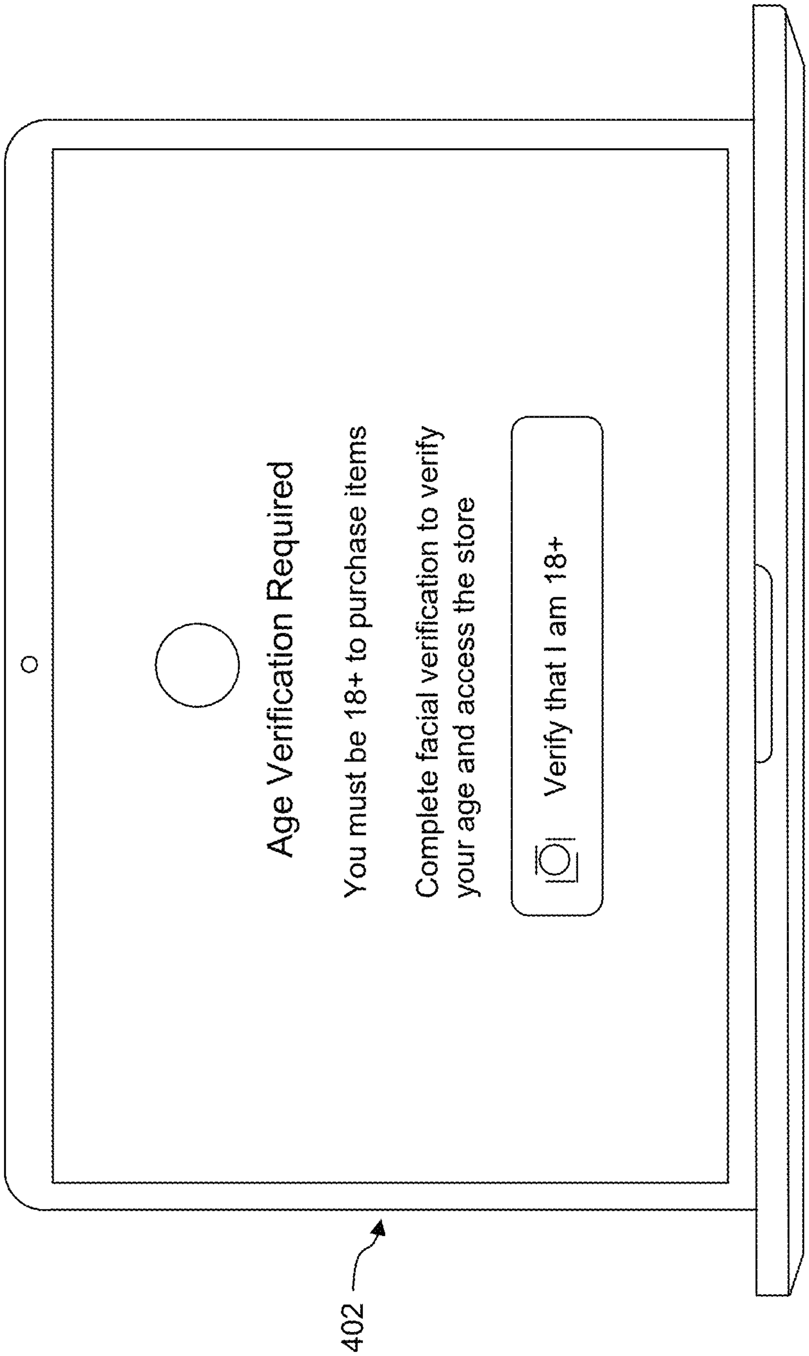
FIGS. 4A-4C are example screen displays of an interface that allow a user to begin an age verification process with a merchant, according to some embodiments.
Figure 4B:
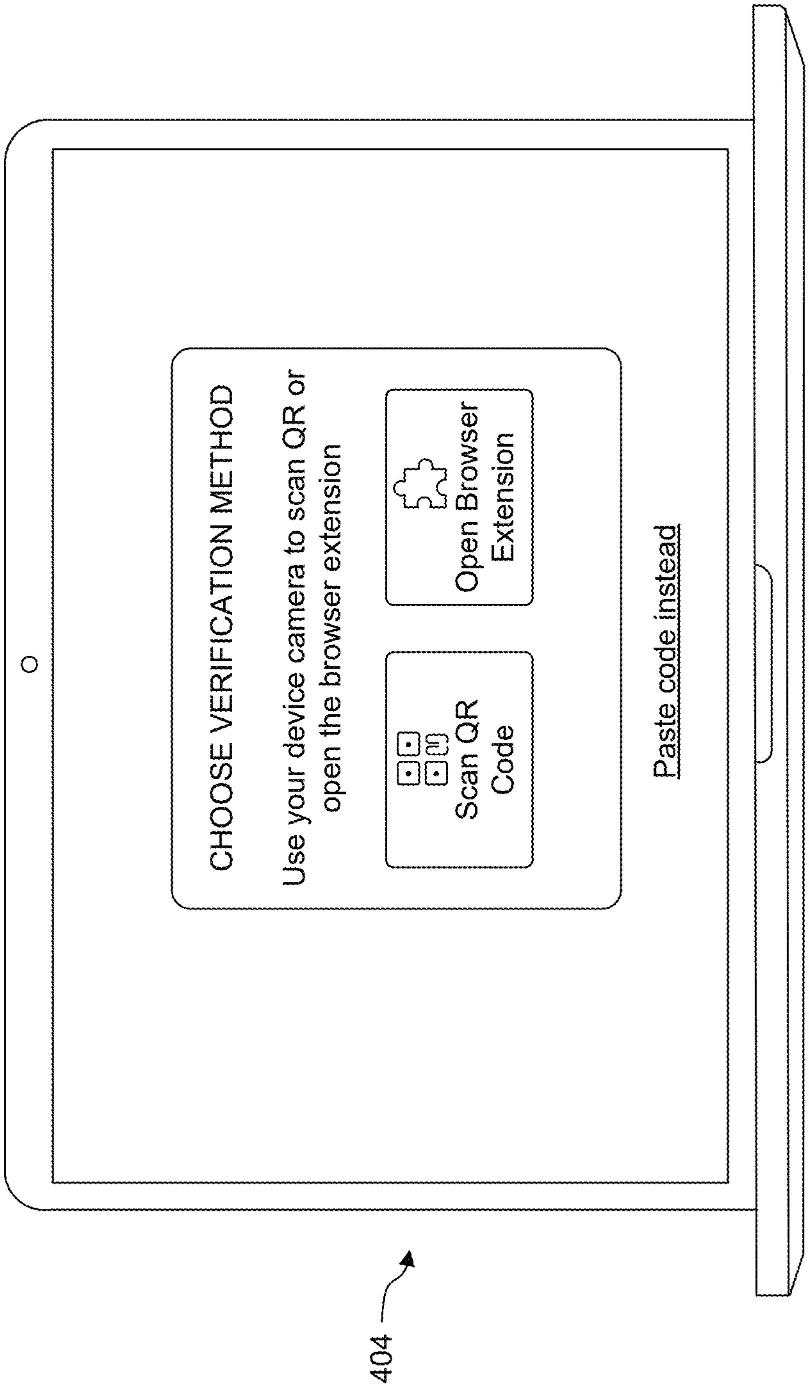
Figure 4C:
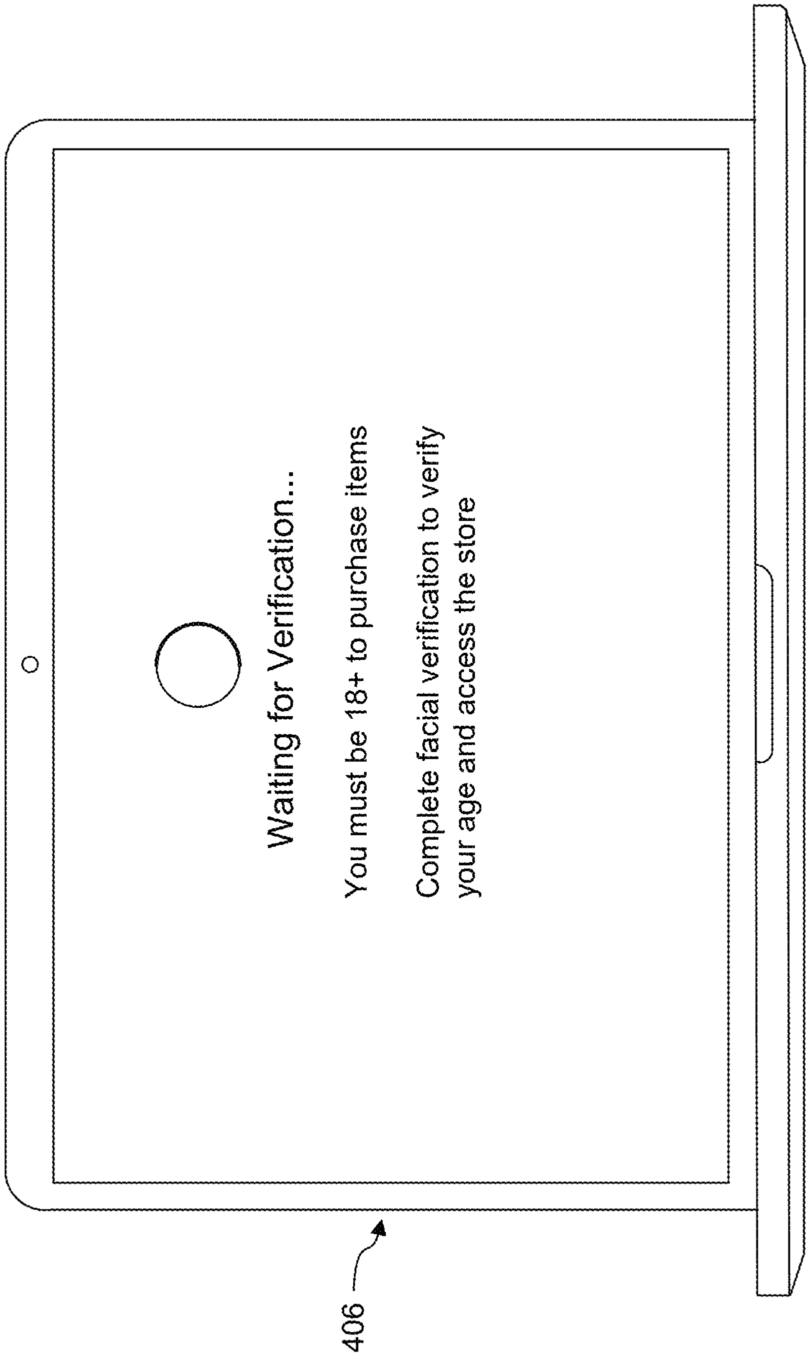

FIGS. 4A-4C are example screen displays of an interface that allow a user to begin an age verification process with a merchant, according to some embodiments. Using this (or a similar) interface, the user may verify their age without sharing personal identifiable information to third parties. The screen displays provided are merely exemplary, and one skilled in the relevant art(s) will appreciate that many approaches may be taken to provide suitable interfaces in accordance with this disclosure. FIGS. 4A-4C shall be described with reference to FIGS. 1A and 1B. However, FIGS. 4A-4C are not limited to that example embodiment.

FIG. 4A illustrates an example screen display of a starting interface that allows user 102 to begin an age verification process for merchant 108. Display screen 402 may be displayed on user device 104 during an age verification process, according to some embodiments. Display screen 402 may demonstrate an initial interaction between user 102 and user device 104 as the user navigates through the age verification workflow using the privacy-preserving techniques described herein.

Display screen 402 may be implemented on a native mobile application, a web-based application running in a browser, or a hybrid application combining native and web technologies. User device may be optimized for touch input on mobile devices, supporting gestures such as tapping, swiping, and pinching. In embodiments where user device includes voice capabilities, display screen 402 may also support voice commands and audio feedback to guide users through the verification process.

The age verification process may begin when user 102 initiates the verification workflow, typically in response to encountering age-restricted content or services. Display screen 402 may communicate to user 102 that an age verification is required in order to access the desired content, create an account etc. Merchant 108 may display this screen in order for the user to select "Verify that I am 18+" on display screen 402. This may effectively begin the age verification process.

The interface may support multiple languages and accessibility features to accommodate diverse user populations. Display screen 402 may automatically detect the device language settings and display appropriate translations. Accessibility features may include support for screen readers, high contrast modes, large text options, and voice guidance for users with visual impairments.

FIG. 4B illustrates an example screen display of an interface that allows a user to select how they would like to begin the age verification process. Using this (or a similar) interface user 102 may select whether they would like to scan a QR code specific to the merchant, open a browser extension, or paste code instead. Display screen 404 may allow the user to select a verification method in order for the merchant to verify the age of the user. Selecting to scan the QR code may result in display screen 404 displaying the QR code for corresponding merchant 108. Selecting to open a browser extension may begin the age verification process on the same user device illustrated in FIG. 4A via an installed browser extension. The browser extension may be the same as software module 128. Selecting paste code instead may result in display screen 422.

FIG. 4C illustrates an example screen display of an interface that informs a user that the merchant is awaiting user 102 to complete the age verification process. User 102 may have scanned the QR code earlier with a mobile device and began the age verification process. The mobile device may be the same as user device 104. Display screen 406 may be the screen displayed to a user once the age verification process has been initiated and before the age of user 102 has been verified.

FIGS. 4D-4J are example screen displays of user interface 126 during the generation of an OTAT on a user's device, according to some embodiments. Using this (or a similar) interface, the user may generate the OTAT. The screen displays provided are merely exemplary, and one skilled in the relevant art(s) will appreciate that many approaches may be taken to provide suitable interfaces in accordance with this disclosure. FIGS. 4D-4J shall be described with reference to FIGS. 1A and 1B. However, FIGS. 4D-4J are not limited to that example embodiment.

Figure 4D:
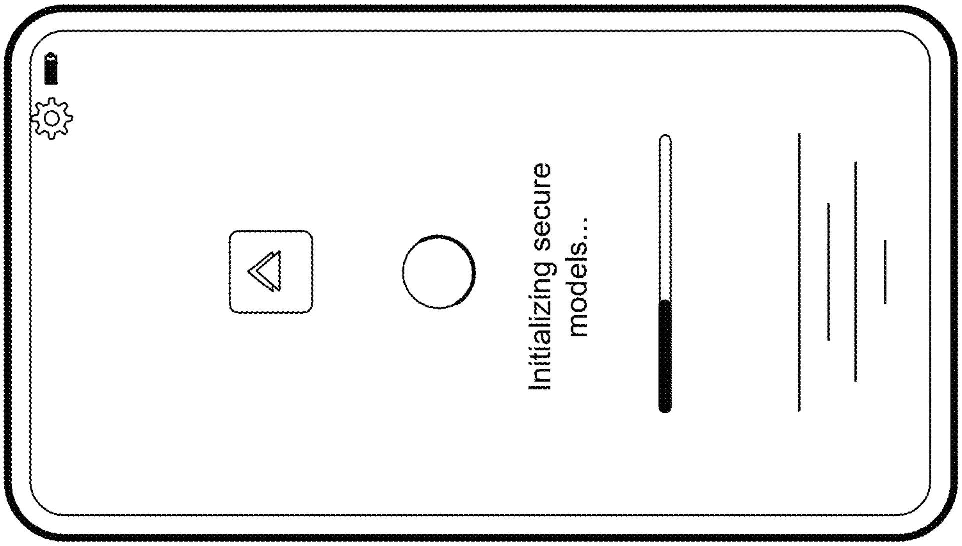
FIGS. 4D-4J are example screen displays of an interface during the generation of a one-time age token on a user's device, according to some embodiments.

FIG. 4D illustrates an example screen display of user interface 126 that informs a user that the machine learning models that may run locally on user device 104 are currently being initialized. Display screen 408 may be displayed once a user launches or accesses the application, such as software module 128. Upon accessing software module 128, machine learning models 130 running on user's device 104 may be initialized and user interface 126 may show display screen 408 to user 102 during this initialization or loading of machine learning models 130.

Figure 4E:
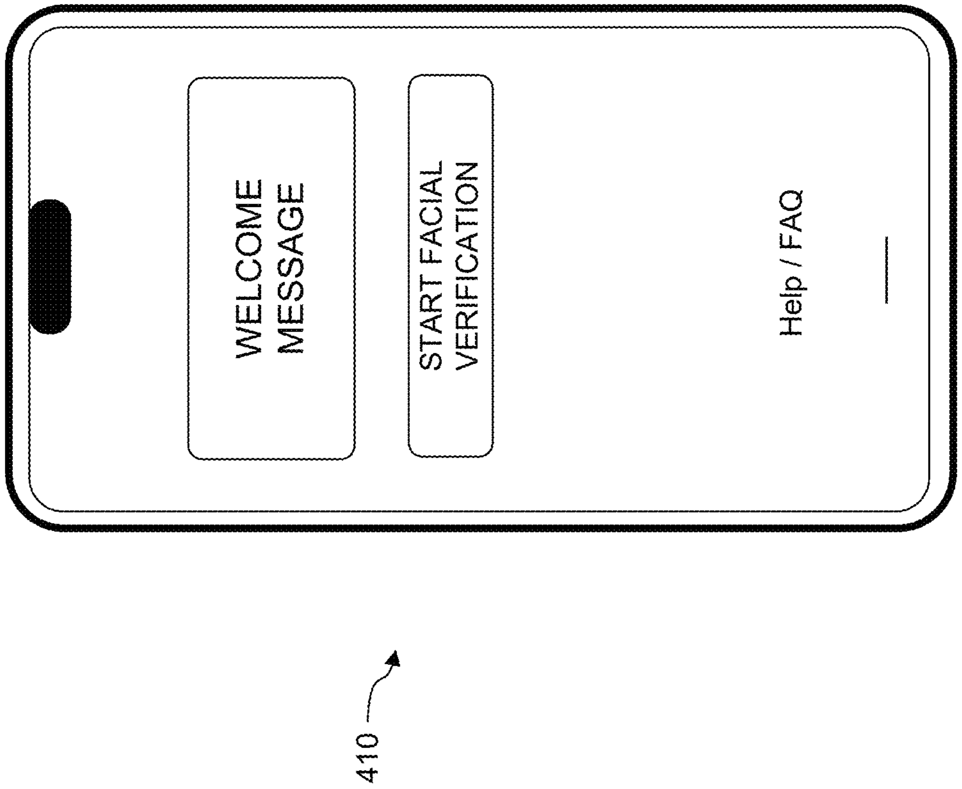

FIG. 4E illustrates an example screen display of user interface 126 that allows a user to select "START FACIAL VERIFICATION." Display screen 410 may be displayed to a user once initial machine learning models are initialized and the age verification process is ready to begin. Display screen 410 allows the user to control when the age verification process starts and when image data may begin to be taken by user device 104.

Figure 4F:
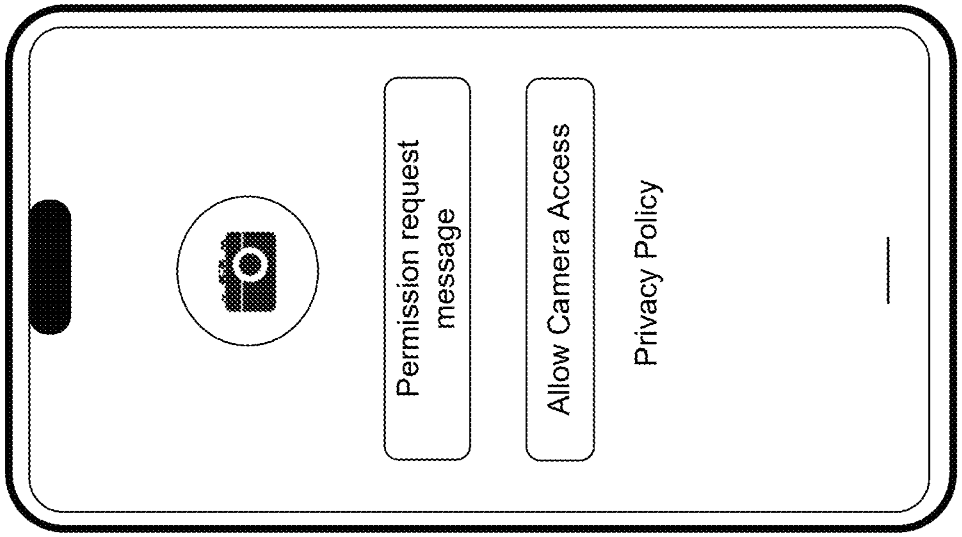

FIG. 4F illustrates an example screen display of user interface 126 that requests permission to access a user's camera. Display screen 412 may comprise a privacy policy that, when selected by user 102, may display information about the purposes for which their data will be used. This information may allow a user to knowingly and willingly consent to the use of their data for the purposes of age verification.

Display screen 412 may further comprise a button labeled "Allow Camera Access". This allows user 102 to select the button to begin the age verification process. Part of the age verification process uses facial images. To obtain facial images, the user may have to give consent for software module 128 to access camera 124 on user device 104. Further, the camera may be used to scan merchant's 108 QR code in order to obtain merchant code 132.

Figure 4G:
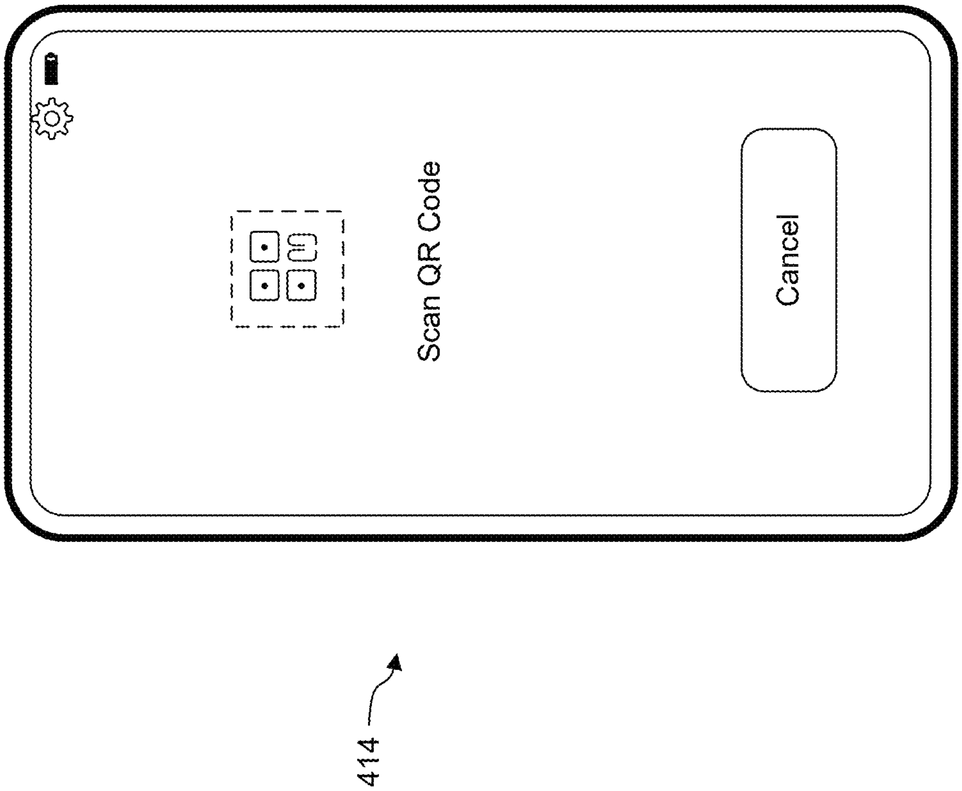

FIG. 4G illustrates an example screen display of user interface 126 that directs user 102 to scan QR code displayed by merchant 108. This QR code may be scanned using camera 124 on user device 104 to obtain merchant code 132 which may be further encoded into the OTAT.

Figure 4H:
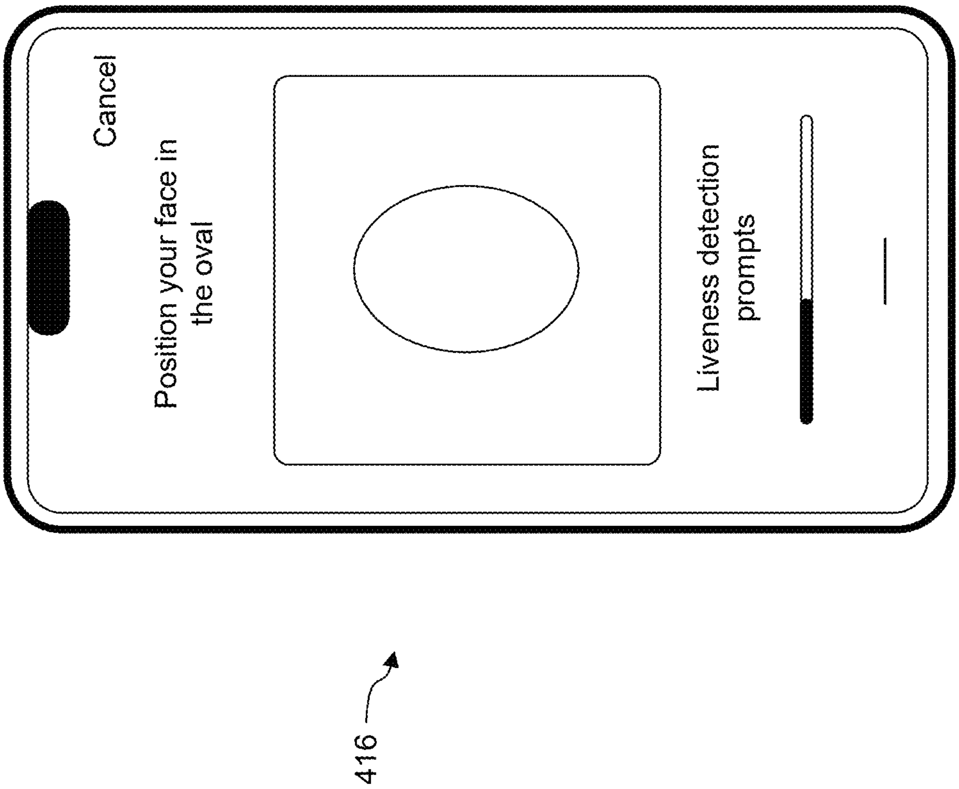

FIG. 4H illustrates an example screen display of user interface 126 that instructs user 102 how to position their face to allow software module 128 to collect facial images using camera 124. Display screen 416 may direct user 102 to position their face in certain ways. For example, display screen 416 directs user 102 to "Position your face in the oval" so that camera 124 can capture facial images used as input to machine learning models 130C-130H. Display screen 416 may instruct the user with further prompts specifically for liveness detection, such as directions to blink or move in a certain manner. These facial images captured during liveness detection prompts may be input specifically into machine learning models related to liveness detection such as machine learning models 130F-130H.

Figure 4I:
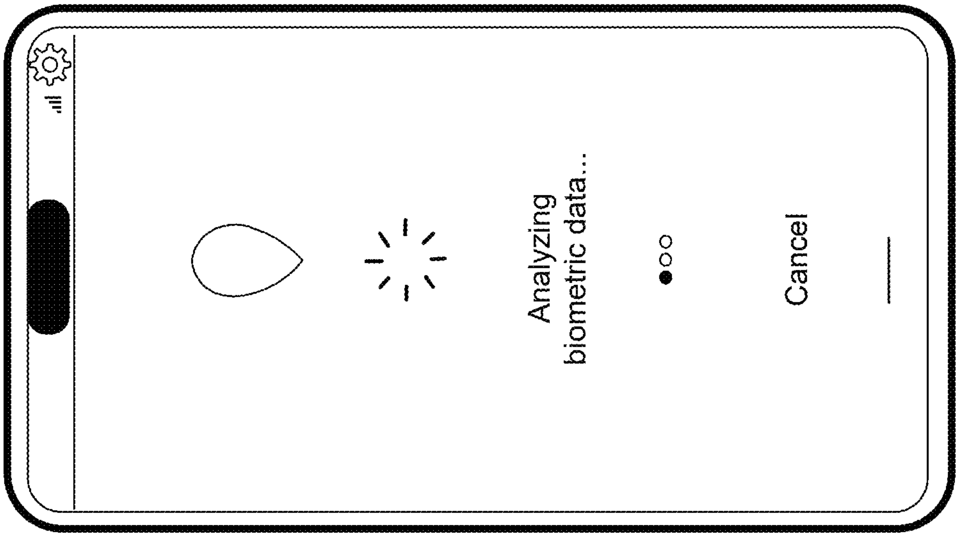

FIG. 4I illustrates an example screen display of user interface 126 that informs user 102 that biometric data, such as facial images, is being analyzed by the age verification process. Display screen 418 may be displayed once biometric data is captured and machine learning models 130 are inferencing. Display screen 418 may also show progress in creation of the OTAT used for age verification.

Figure 4J:
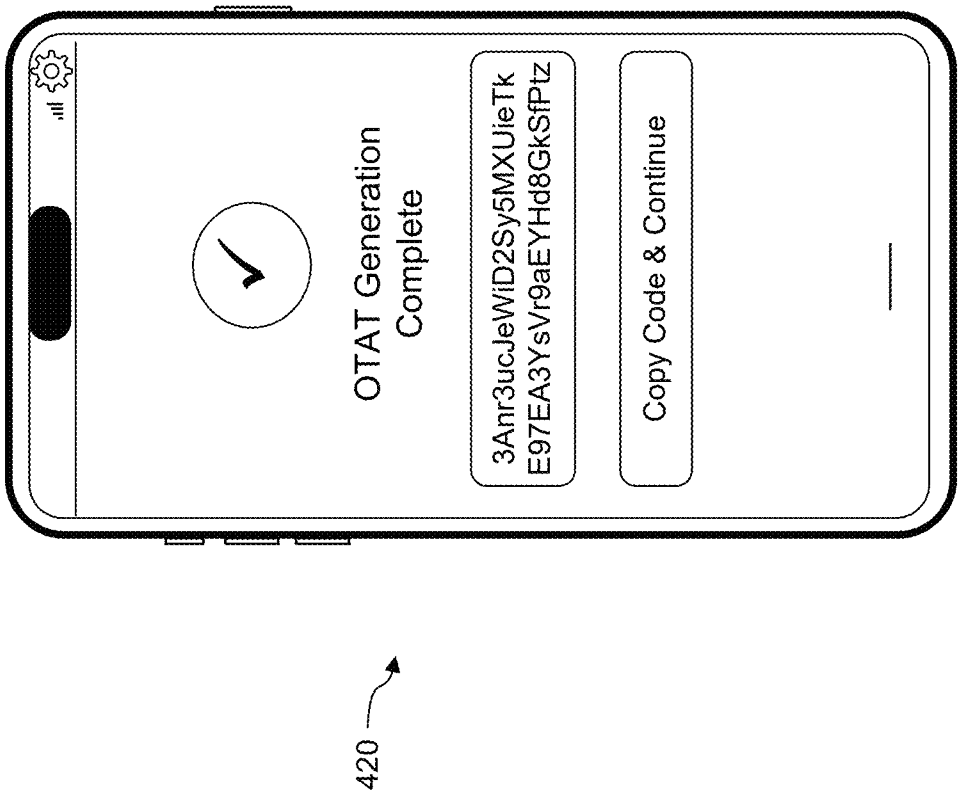

FIG. 4J illustrates an example screen display of user interface 126 that displays the OTAT to user 102. Display screen 420 may inform user 102 that the OTAT generation has been completed. Further, the OTAT may be displayed for the user to copy and submit to merchant 108. User 102 may copy and paste or manually type the OTAT into a display screen for merchant 108 such as display screen 422.

Figure 4K:
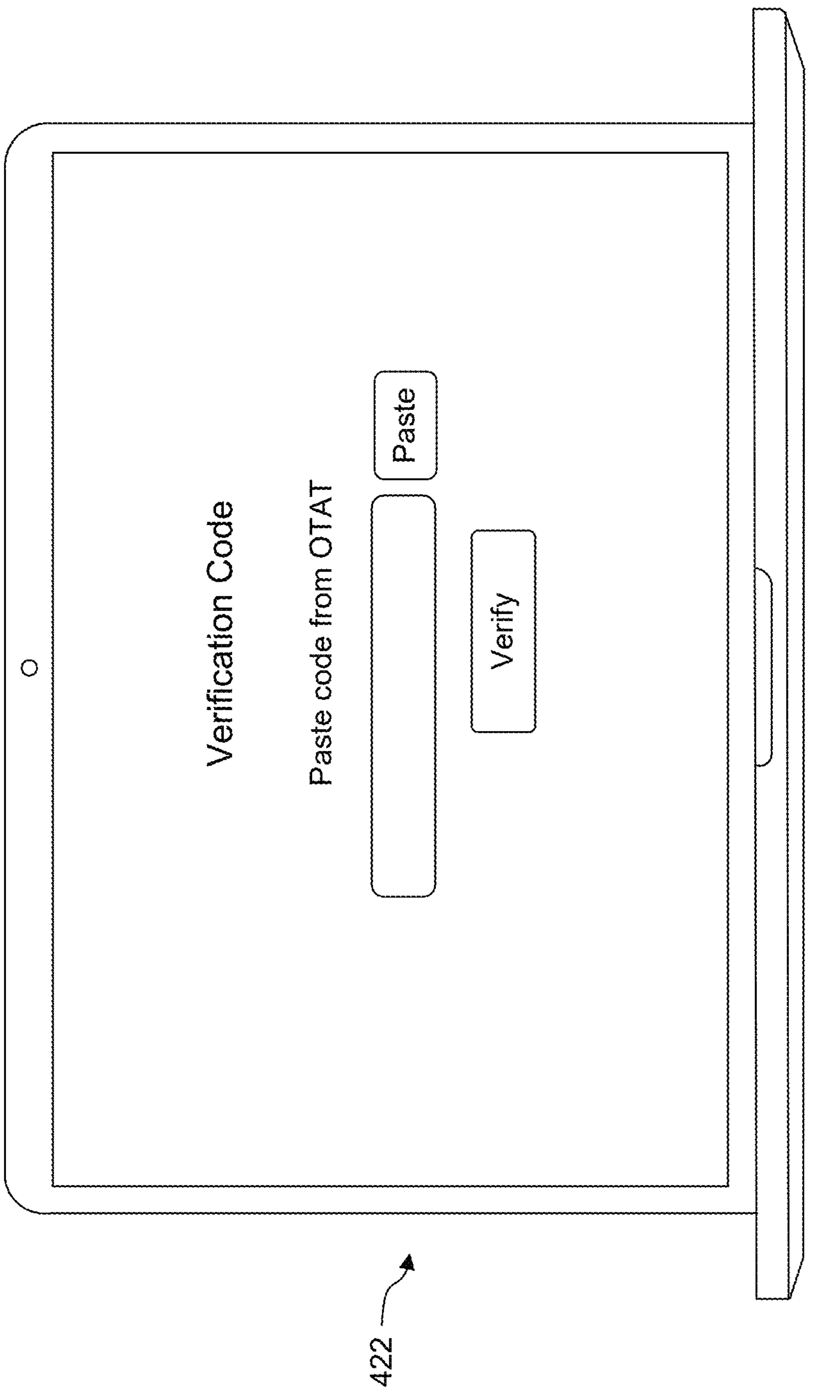
FIGS. 4K-4L are example screen displays of an interface that allow the OTAT to be submitted to a merchant for age verification, according to some embodiments.
Figure 4L:
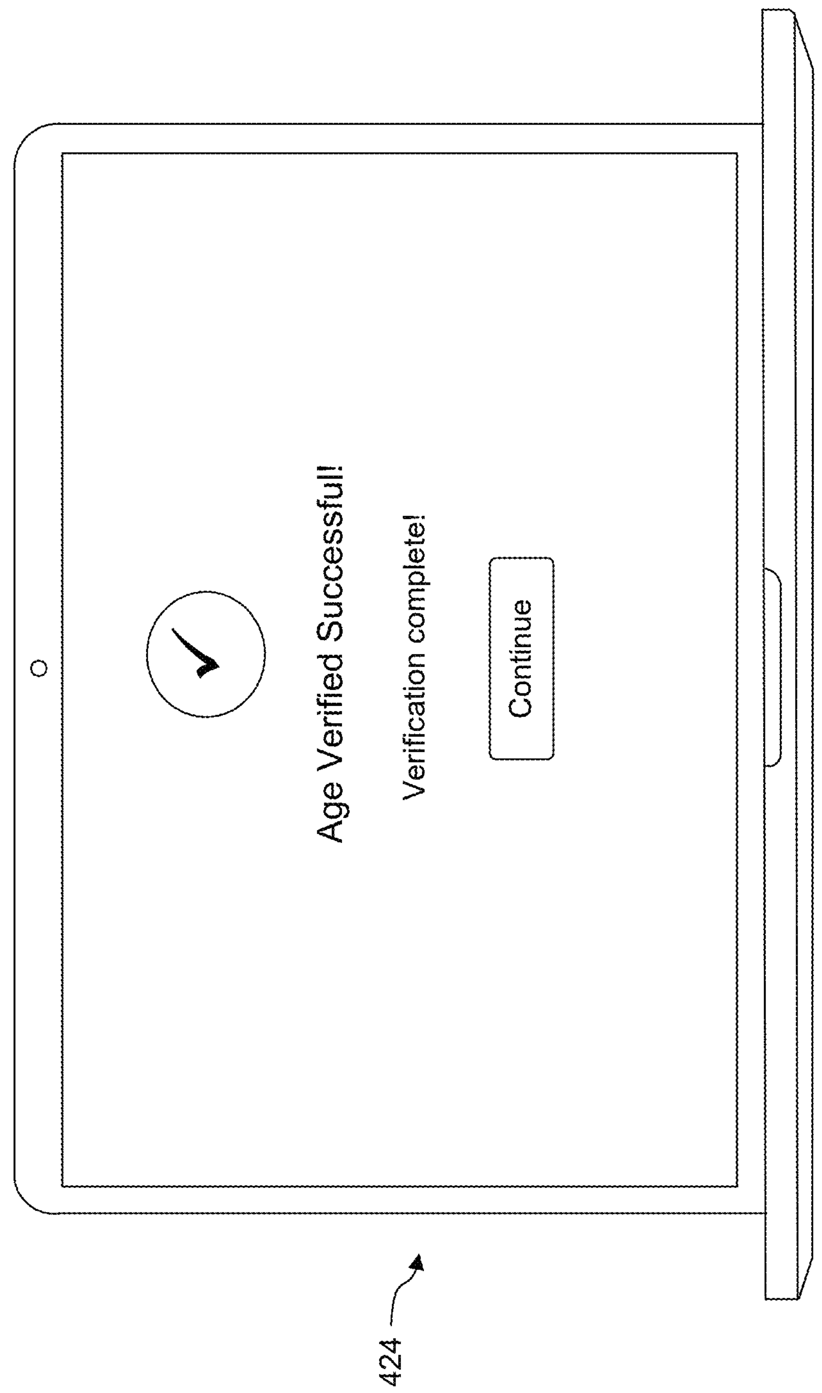

FIGS. 4K-4L are example screen displays of an interface that allow the OTAT to be submitted to a merchant for age verification, according to some embodiments. Using this (or a similar) interface, the user may submit the OTAT. The screen displays provided are merely exemplary, and one skilled in the relevant art(s) will appreciate that many approaches may be taken to provide suitable interfaces in accordance with this disclosure. FIGS. 4K-4L shall be described with reference to FIGS. 1A and 1B. However, FIGS. 4K-4L are not limited to that example embodiment.

FIG. 4K illustrates an example screen display of an interface that allows user 102 to submit their OTAT. Display screen 422 may have a submission field for user 102 to submit their OTAT. Display screen 422 may further comprise a verify button for user 102 to submit their OTAT to merchant 108.

FIG. 4L illustrates an example screen display of an interface that informs user 102 that their age has been verified successfully using their generated OTAT. Once user 102 has been verified to be of age to access the age-restricted content, user 102 may select the button labeled "continue" on display screen 424 to continue to the age-restricted content. Display screen 424 may be the last screen displayed to user 102 during the age verification process.

Figure 5:
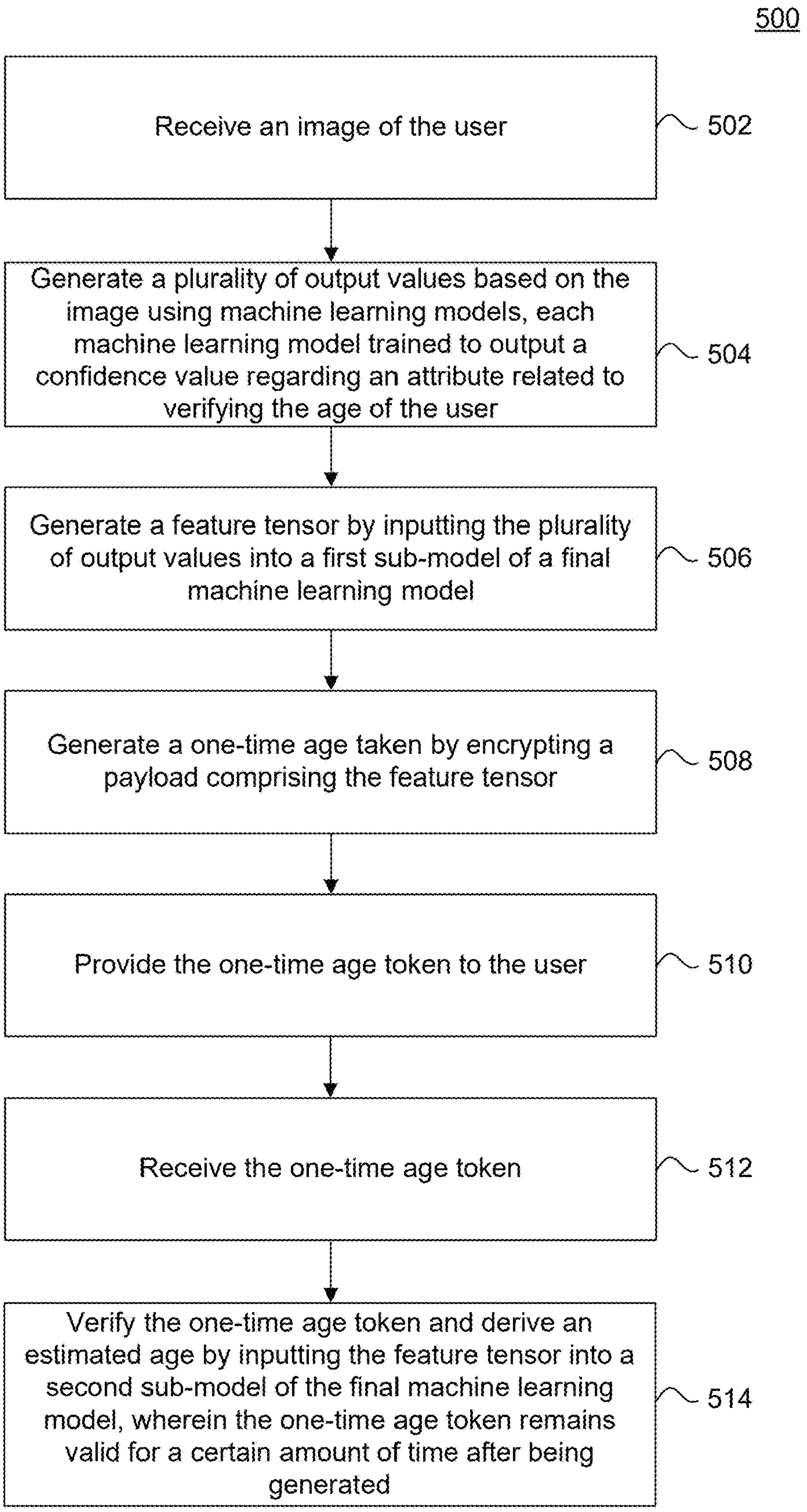
FIG. 5 illustrates a method for verifying the age of a user, according to some embodiments.

FIG. 5 illustrates method 500 for verifying the age of a user, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 1. However, method 500 is not limited to that example embodiment. Method 500 may be performed by any suitable computing device, system, or combination thereof, such as user device 104, age verification platform 112, or computer system 600. Method 500 may demonstrate the comprehensive process flow for generating and utilizing OTATs while preserving user privacy and ensuring secure age verification across multiple deployment scenarios.

In 502 user device 104 may receive an image of a face of the user. 502 may represent the initial data capture phase of the age verification process. In some embodiments, the image may be captured using camera 124 integrated within user device 104, which may be a smartphone, tablet, laptop, or dedicated kiosk device. The image capture process may utilize digital imaging sensor(s) 122 to ensure high-quality facial data acquisition suitable for subsequent machine learning analysis.

The facial image capture at 502 may involve multiple sophisticated techniques to ensure optimal data quality. For example, user device 104 may implement real-time face detection algorithms to guide the user in positioning their face correctly within the camera frame. User device 104 may provide visual feedback through user interface 126, displaying guidelines such as face outline overlays, distance indicators, or lighting adequacy meters. In some embodiments, camera 124 may capture multiple images in rapid succession to select the highest quality frame based on factors such as focus sharpness, lighting conditions, facial positioning, and absence of motion blur.

Additionally, 502 may incorporate advanced liveness detection measures during the image capture process. For instance, user device 104 may require the user to perform specific actions such as blinking, turning their head slightly, or following a moving object with their eyes. These actions may help ensure that the captured image represents a live person rather than a photograph, video, or sophisticated deepfake attempt.

In various deployment scenarios, step 502 may be adapted to different environmental conditions and use cases. For example, in a retail environment, the image capture may occur at a point-of-sale terminal with controlled lighting conditions. In a mobile application scenario, user device 104 may automatically adjust camera 124 settings based on ambient light detection. For accessibility purposes, user device 104 may provide audio guidance through user interface 126 for users with visual impairments or support alternative input methods for users with mobility limitations.

In 504, user device 104 may generate a plurality of output values based on the image using a plurality of machine learning models 130C-130H. Each machine learning model may be specifically trained to output a confidence value regarding an attribute related to verifying the age of the user. This step may represent the core of the split processing approach that enables efficient client-side computation while maintaining accuracy and security.

The plurality of machine learning models 130C-130H employed in 504 may include several specialized model categories. A first set of machine learning models 130F-130H, may focus on detecting image liveness and authenticity. These models may analyze various aspects of the captured image to determine whether it represents a genuine, live person. For example, one model may examine skin texture patterns that are characteristic of real human skin versus printed photographs. Another model may analyze eye movement patterns, pupil dilation responses, or micro-expressions that indicate natural human behavior.

A second set of machine learning models 130C-130E, may concentrate on estimating the user's age based on the received image of the user. These models may analyze factors such as facial structure, skin texture, wrinkle patterns, hair characteristics, and other age-related indicators. Machine learning models 130C-130E may be trained on diverse datasets representing various ethnicities, genders, and age ranges to ensure broad applicability and minimize bias.

Machine learning models 130C-130H in step 504 may operate in parallel processing configurations to optimize performance and reduce overall computation time. This parallel execution may be particularly advantageous for user device 104 with limited processing power, as it allows the workload to be distributed across multiple processing cores or specialized hardware accelerators. Each machine learning model 130C-130H may be optimized for specific hardware configurations, such as utilizing GPU acceleration for image processing tasks or leveraging dedicated neural processing units (NPUs) where available.

The output values generated in step 504 may represent confidence scores or probability distributions for each analyzed attribute. For instance, machine learning model 130C may output a confidence score between 0 and 1, where values closer to 1 indicate higher confidence that the image represents a user that is balding.

In 506, user device 104 may generate a feature tensor by inputting the plurality of output values into a first sub-model of a final machine learning mode. This step may allow the split inferencing technique that enables secure token generation while preventing unauthorized access to the complete model. The plurality of output values from 504 may be used as inputs into a first sub-model of the final machine learning model. This first sub-model may represent a subset of the complete final machine learning model and may be configured to stop inference at predetermined layer k. The selection of predetermined layer k may be critical for balancing security and functionality, as it must provide sufficient processing to generate meaningful feature representations while preventing complete model reconstruction.

The first sub-model may process the input values through multiple neural network layers, performing complex mathematical transformations that combine and weight the various confidence scores and attribute assessments. The feature tensor may represent a high-dimensional mathematical representation that cannot be reverse-engineered to reconstruct the original image or personally identifiable information.

In some embodiments the first sub-model of the final machine learning model may be age estimation machine learning model 130A or liveness machine learning model 130B. In other embodiments, not shown in FIG. 1, the sub-model of the final machine learning model may be a machine learning model that can both estimate age and detect liveness of a user in one model. The first sub-model of the final machine learning model can then begin inference and stop at a predetermined layer k. At this point the final machine learning model has generated a feature tensor at this predetermined layer k.

For example, age estimation machine learning model 130A may generate feature tensors after performing inference to predetermine layer k 136. Age estimation machine learning model 130A may take as input the outputs of machine learning model 130C-130E. Similarly, liveness machine learning model 130B may generate feature tensors after performing inference to predetermine layer k 138. Liveness machine learning model 130B may take as input the outputs of machine learning model 130F-130H.

In 508, user device 104 may generate an OTAT by encrypting a payload comprising the feature tensor. In some embodiments, the payload further comprises security and integrity parameters. The OTAT may remain valid for a certain amount of time after being generated. User device 104 may generate the OTAT by (i) serializing a payload comprising the feature tensor and associated metadata, (ii) performing a key encapsulation mechanism (KEM) using a public key of age verification platform 112 to generate an encapsulation ciphertext and a shared secret, (iii) deriving a symmetric encryption key from the shared secret, and (iv) encrypting a serialized payload comprising the one-time age token using the symmetric encryption key with authenticated encryption with associated data (AEAD). The OTAT may comprise the encapsulation ciphertext and the AEAD ciphertext (and, when applicable, an AEAD nonce/initialization vector) such that age verification platform 112 can recover the shared secret via decapsulation and decrypt the payload. Moreover, age verification platform 112 may decapsulate the encapsulation ciphertext using a private key corresponding to the public key to recover the shared secret and decrypt the payload using the symmetric encryption key.

The OTAT generated in 508 may possess several important characteristics that enhance security and privacy. The token may have a limited validity period, typically ranging from a few minutes to several hours, depending on the specific use case and security requirements. This time limitation may prevent token reuse and reduce the risk of unauthorized access if a token is compromised. Additionally, the token may be designed to be used only once, and age verification platform 112 may mark it as used after successful verification, preventing multiple uses of the same token.

In 508 encrypted string generator 134 may incorporate merchant code 132 into the token generation process. The user may scan a QR code displayed on the merchant's website or application using user device 104, and the resulting merchant identifier may be encoded into the OTAT. In other embodiments, the merchant code is authenticated as associated data (AAD) for AEAD encryption of the OTAT, thereby cryptographically binding the OTAT to the merchant without using the merchant code as encryption key material. This may create a merchant-dependent token that will only function for the specific merchant that provided the code, adding an additional layer of security and preventing cross-merchant token sharing.

In 510 user interface 126 may provide the OTAT to the user. This step may involve presenting the token through user interface 126 in a format that enables easy transfer to the merchant's verification system. The token may be displayed as a text string that the user can copy and paste or presented as a QR code for scanning The presentation of the OTAT in 510 may accommodate various user interaction preferences and technical capabilities. For manual entry, user interface 126 may display the token as a formatted text string with clear visual separation for easy reading and transcription. For users preferring automated transfer user device 104 may generate a QR code that can be scanned by the merchant's system.

In some embodiments, 510 may include additional user guidance and verification steps. User interface 126 may display instructions explaining how to use the token, including time limitations and usage restrictions. User interface 126 may also provide confirmation that the token has been successfully generated and is ready for use, along with estimated remaining validity time.

In 512 age verification platform 112 may receive the OTAT from merchant 108. Merchant 108 may use API(s) 114 in order to transmit the received string to age verification platform 112 over network 110.

In 514 age verification platform 112 may verify the OTAT and derive an estimated age by inputting the feature tensor into a second sub-model of the final machine learning model, wherein the OTAT remains valid for a certain amount of time after being generated. 514 may occur on age verification platform 112 and may represent the server-side component of the split inferencing process using machine learning model 116. Age verification platform 112 may receive the token from the merchant system and perform the remaining inference steps to complete the age verification process.

In 514 age verification platform 112 may decrypt the received OTAT to extract the feature tensor and associated metadata. Age verification platform 112 may decapsulate the encapsulation ciphertext in the OTAT using private key 120 to recover a shared secret, derive a symmetric encryption key from the shared secret, and decrypt the payload using authenticated encryption with associated data (AEAD). The decryption process may also validate the token's integrity and authenticity by verifying the AEAD authentication tag and validating any associated data (AAD) such as merchant code 132, timestamps, and token identifiers, thereby detecting any attempts at tampering or forgery.

Following successful decryption, age verification platform 112 may input the extracted feature tensor into a second sub-model of the final machine learning model. This second sub-model may represent the remaining layers of the complete model, starting from predetermined layer k and continuing through the final output layers. The second sub-model may process the feature tensor through additional neural network layers to generate the final age estimation and liveness verification result.

For example, the second sub-model of the final machine learning model may be the remaining model of age estimation machine learning model 130A or liveness machine learning model 130B. The feature tensor extracted from the OTAT may comprise the feature tensor of age estimation machine learning model 130A at predetermined layer k 136 and/or liveness machine learning model 130B at predetermined layer k 138. The remaining, or second sub-model, may resume inference at the predetermined layer k.

The server-side processing in 514 may incorporate additional verification s beyond the core machine learning inference. For example, age verification platform 112 may validate timestamp information to ensure the token is within its validity period. In merchant-specific scenarios, age verification platform 112 may verify that merchant code 132 embedded in the token matches the merchant code provided with the verification request, ensuring that the token is being used by the intended recipient.

Method 500 may conclude at 514, where age verification platform 112 may provide a verification result to the requesting merchant system. This result may typically include a binary verification status (pass/fail) along with any additional information required by the merchant's application. Age verification platform 112 may also log the verification event for audit purposes while maintaining user privacy by not storing personally identifiable information.

The verification result provided in 514 may include various levels of detail depending on the merchant's requirements and regulatory compliance needs. For basic age verification, the result may simply indicate whether the user meets the minimum age requirement. For more sophisticated applications, the result may include confidence scores, estimated age ranges, or additional demographic information that can inform business decisions while respecting privacy constraints. In some embodiments, 514 may trigger additional post-verification processes. Age verification platform 112 may mark the OTAT as used to prevent reuse, update usage statistics for monitoring and analytics purposes, etc.

Figure 6:
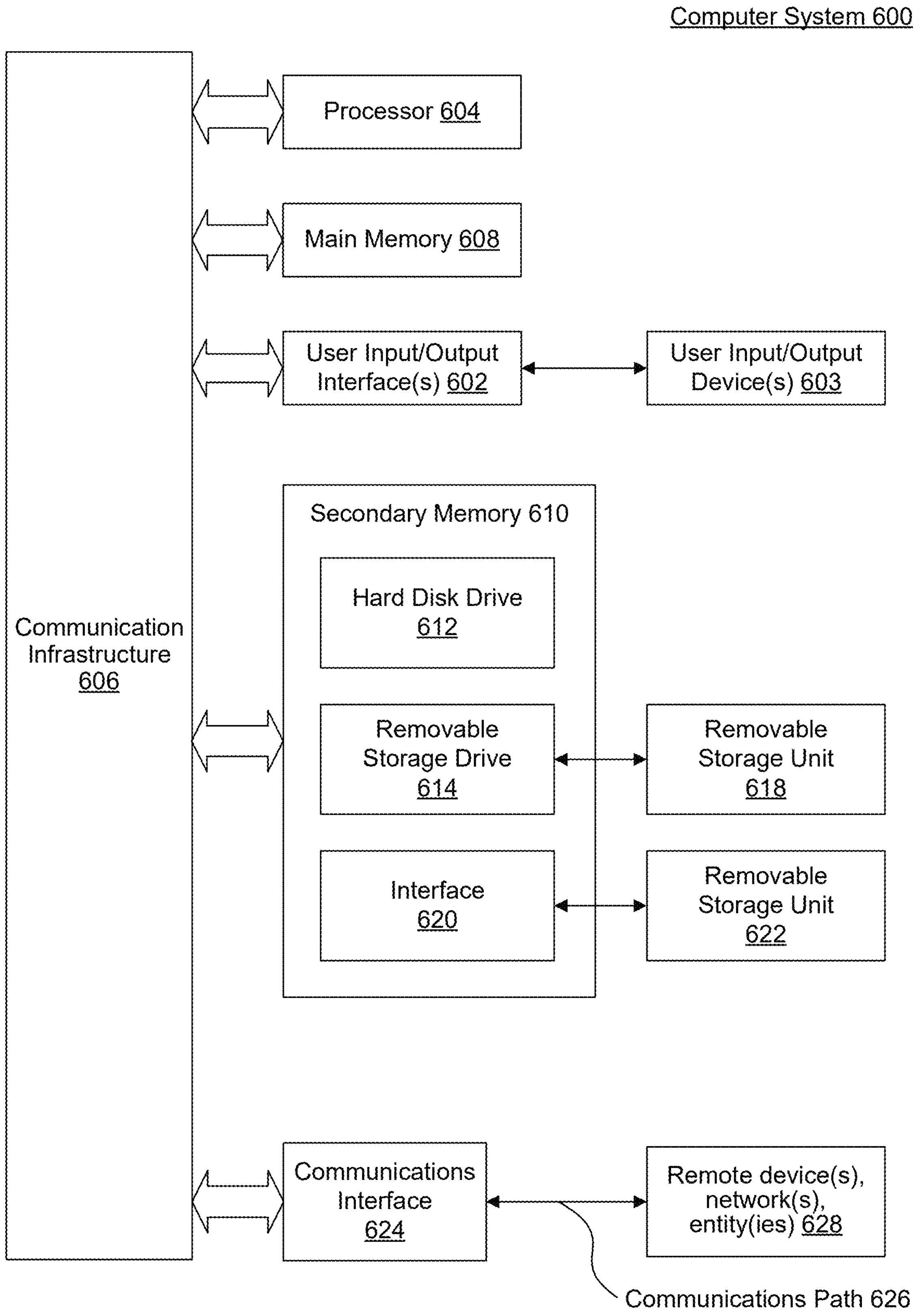
FIG. 6 illustrates a computer system, according to exemplary embodiments of the present disclosure.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, s, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for verifying an age of a user, comprising:

a client device comprising a memory and at least one processor coupled to the memory and configured to:

receive an image of a face of the user;

generate a plurality of output values based on the image using a plurality of machine learning models, each machine learning model trained to output a confidence value regarding an attribute related to verifying the age of the user;

generate a feature tensor by inputting the plurality of output values into a first sub-model of a final machine learning model;

generate a one-time age token by encrypting a payload comprising the feature tensor; and provide the one-time age token to the user; and a server device comprising a second memory and a second at least one processor coupled to the second memory and configured to:

receive the one-time age token; and verify the one-time age token and derive an estimated age by inputting the feature tensor into a second sub-model of the final machine learning model, wherein the one-time age token remains valid for a certain amount of time after being generated.

2. The system of claim 1, wherein the plurality of machine learning models comprise a first set of machine learning models that detect an image liveness and a second set of machine learning models that estimate the age of the user.

3. The system of claim 1, wherein the first sub-model is a first subset of the final machine learning model and is configured to stop inference at a predetermined layer k, and wherein the second sub-model is a second subset of the final machine learning model and is configured to resume inference at the predetermined layer k.

4. The system of claim 1, wherein the at least one processor is further configured to generate the one-time age token by (i) performing a key encapsulation mechanism (KEM) using a public key of the server device to generate an encapsulation ciphertext and a shared secret, (ii) deriving a symmetric encryption key from the shared secret, and (iii) encrypting a payload comprising the one-time age token using the symmetric encryption key with authenticated encryption with associated data (AEAD), wherein the second at least one processor is further configured to decapsulate the encapsulation ciphertext using a private key corresponding to the public key to recover the shared secret and decrypt the payload using the symmetric encryption key.

5. The system of claim 1, wherein the at least one processor is further configured to encode a merchant code into the one-time age token, and wherein the second at least one processor is further configured to verify that the merchant code in the one-time age token matches a second merchant code received with the one-time age token.

6. The system of claim 1, wherein the plurality of machine learning models run in parallel.

7. The system of claim 1, the second at least one processor further configured to:

mark the one-time age token as used after verifying the age of the user.

* * * * *